United States Patent
Kuwajima et al.

(10) Patent No.: US 6,826,018 B2
(45) Date of Patent: Nov. 30, 2004

(54) DISK DRIVE WITH HEAD SUPPORTING DEVICE

(75) Inventors: Hideki Kuwajima, Kyoto (JP); Koichi Shinohara, Hyogo (JP); Kaoru Matsuoka, Osaka (JP); Kenichi Sakamoto, Osaka (JP); Makoto Miyamoto, Hyogo (JP); Shigeo Obata, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 321 days.

(21) Appl. No.: 10/087,420

(22) Filed: Mar. 1, 2002

(65) Prior Publication Data

US 2002/0145822 A1 Oct. 10, 2002

(30) Foreign Application Priority Data

Mar. 6, 2001 (JP) ........................................ 2001-061300
May 7, 2001 (JP) ........................................ 2001-136010

(51) Int. Cl.7 .......................... G11B 21/22; G11B 17/00
(52) U.S. Cl. ................................ 360/254.3; 360/97.01
(58) Field of Search ........................... 360/97.01, 255.2, 360/255.5, 254.3, 254.6

(56) References Cited

U.S. PATENT DOCUMENTS

| 4,571,648 A | 2/1986 | Barski |
| 4,605,979 A | * 8/1986 | Inoue et al. ............. 360/254.3 |
| 5,264,975 A | * 11/1993 | Bajorek et al. ........... 360/97.01 |
| 5,671,197 A | * 9/1997 | Matsuda et al. ............ 369/222 |
| 5,822,152 A | 10/1998 | Seaver et al. |
| 5,880,904 A | 3/1999 | Mizoshita et al. |
| 6,046,881 A | 4/2000 | Tielemans et al. |

FOREIGN PATENT DOCUMENTS

| JP | 60-101780 | 6/1985 |
| JP | 3-88186 | 4/1991 |
| JP | 4-311845 | 11/1992 |
| JP | 5-135523 | 6/1993 |
| JP | 5-159262 | 6/1993 |
| JP | 5-174564 | 7/1993 |
| JP | 8-7504 | 1/1996 |
| JP | 9-82052 | 3/1997 |
| JP | 9-180360 | 7/1997 |
| JP | 9-265771 | 10/1997 |
| WO | WO 00/74049 | 12/2000 |

* cited by examiner

*Primary Examiner*—David Davis
(74) *Attorney, Agent, or Firm*—RatnerPrestia

(57) ABSTRACT

A disk drive comprises a recording medium, spinning means, a head supporting device having a support arm disposed in a rotatable manner about a bearing unit in a radial direction as well as a perpendicular direction to a writing surface of the recording medium, and rotating means for rotating the support arm in the radial direction of the recording medium. A shape of the housing is defined based on a first straight line tangent to both an outermost rim of the rotating means and an outer periphery of the recording medium, and according to a quadrilateral comprised of the first straight line, a second straight line tangent to the outer periphery of the recording medium and perpendicular to the first straight line, a third straight line tangent to the outermost rim of the rotating means and perpendicular to the first straight line, and a fourth straight line tangent to the outer periphery of the recording medium and parallel with the first straight line, thereby realizing the disk drive that is compatible in external size with memory cards.

21 Claims, 14 Drawing Sheets

DISK DRIVE WITH HEAD SUPPORTING DEVICE

FIELD OF THE INVENTION

The present invention relates to a disk drive for reading from and/or writing to a spinning-type discoidal recording medium and more particularly to a device structure of a compact, low profile disk drive.

BACKGROUND OF THE INVENTION

Memory cards that are compact, highly portable, and capable of storing massive data such as Compact-Flash card, Smart Media, Memory Stick, SD memory card (all are registered trademarks), and the like have been put to practical use in late years for the purpose of transferring data of large size like an image data, etc. between small apparatuses such as digital camera and portable information device (PDA and cellular phone, for instance), or between any such device and personal computer and the like.

However, such memory cards naturally have limitations on further increase in their memory capacities because they use flash memories as recording media.

One of the techniques expected to break through these limitations pertains to disk-type write/read device (hereinafter referred to as disk drive), represented by magnetic write/read devices such as hard disk drives.

There is continuing advancement of magnetic disk drives in particular, toward higher recording density year after year with substantial improvement in magnetic heads for writing and/or reading data and magnetic recording layer formed on discoidal recording media (hereinafter referred to as recording medium), as well as progress in technology of signal processing, and the range of uses of the disk drives is expanding broadly into many fields besides the ordinary computers.

Described hereinafter is an example of a structure of magnetic disk drive as a representative structure of the conventional disk drive.

FIG. 13 is a perspective view showing a main portion of magnetic disk drive 100 of the prior art. Magnetic recording medium 101 is supported by main shaft 102 and rotatory driven by spinning means 103. Slider 104 having a magnetic head element (not shown in the figure, and hereinafter referred to simply as magnetic head) for performing writing and reading functions is fixed to support arm 105. Further, the support arm 105 is mounted in a rotatable manner to bearing unit 106.

Rotating means 107 rotates the support arm 105 to move the magnetic head to a position corresponding to a given track on the magnetic recording medium 101. Flexible wiring board 108 makes signal transmission to the magnetic head and supplies electricity to the rotating means 107.

The flexible wiring board 108 is extended from a side surface of the baring unit 106, and connected to control circuit 109 disposed to an inside of base 110a. In addition, there is connector 111 disposed to one end of the base 110a for connection of the magnetic disk drive to another device.

The base 110a is provided with screw holes 112, to which an unillustrated cover is mounted with screws, to complete an integrated housing 110.

In the magnetic disk drive 100 of the prior art constructed as above, an airflow occurs on a surface of the magnetic recording medium 101 when the magnetic recording medium 101 is spun by the spinning means 103, and the slider 104 rested on the surface of the magnetic recording medium 101 levitates. Data is written on the magnetic recording medium 101, and the data recorded on the recording medium 101 is read by the magnetic head in its levitating state as described above.

In order to make such a magnetic disk drive of the prior art mountable to a portable information device such as cellular phone, PDA, and the like, it is necessary to make its shape and specifications compatible with a memory card utilizing a semiconductor that has already been put to practical use. Moreover, it is also necessary to realize the disk drive of large capacity and low cost as compared to the memory card utilizing a semiconductor in order to differentiate it from the semiconductor memory card.

There have been proposed heretofore a number of techniques for instance, to construct a magnetic disk drive of large capacity in the size of memory card utilizing a semiconductor, and some of them have been put to practical use.

To construct a magnetic disk drive compatible with the memory card, the proposed technique must fulfill four requirements all together.

The four requirements are:
1) planar dimensions (length×width) compatible with the memory card;
2) a thickness compatible with the memory card;
3) resistance to shock to an extent generally equivalent to the memory card; and
4) a storage capacity greater than that of the memory card.

International Publication, No. WO 00/74049, for instance, discloses a disk drive of such a structure that a housing is provided with a cavity in an area outside of a rotating space of a support arm, and semiconductors are mounted on an exterior surface of this cavity.

The technique proposed there is this structure that achieves a size compatible with the external dimensions (approximately 43 mm by 36 mm by 3.3 mm) of the Compact Flash card which is one kind of the semiconductor memory card.

In this example, although a reduction in thickness is attainable to such an extent necessary for mounting semiconductors, there is not disclosed any technique to further reduce the device into a size of the still thinner semiconductor memory card (e.g., the Memory Stick, the SD memory card, and the like) required for installation in a portable information device.

In other words, it is difficult to realize a disk drive having the desired shape and storage capacity according to the technique disclosed there.

Furthermore, there is disclosed in Japanese Patent Laid-open Publication, No. H08-7504 (U.S. Pat. No. 5,671,197), a magnetic disk drive of such a structure that a resistor is connected in series with a coil of a voice coil motor in order to reduce power consumption of the voice coil motor, which otherwise gives rise to a problem in the course of attempting miniaturization of the disk drive. According to it, there is provided the disk drive equipped with a magnetic recording medium of 0.7 inch (approximately 17 mm) in diameter, with unit dimensions of approximately 19 mm wide by approximately 26 mm long by approximately 10.5 mm thick.

According to this disclosed example, although the magnetic disk drive has a shape sufficiently permissible to a portable information device in respect of the planer dimensions, its thickness is not the size permissible for installation into the portable information device.

In addition, it is necessary to install at least plural units of the disk drives in order to provide a larger storage capacity than the semiconductor memory card. If this is the case, an overall size of the device becomes so large as to make it difficult to be mounted into the portable information device.

Described next pertains to a structure of a prior art magnetic disk drive, which is designed to improve a resistance to shock, with a special emphasis placed on a structure associated with a head supporting device.

FIG. 14 is a plan view depicting a structure of magnetic disk drive 250 of the prior art.

In FIG. 14, head supporting device 208 comprises suspension 202 of a comparatively low rigidity, plate spring 203, and support arm 204 of a comparatively high rigidity. In this structure, the suspension 202 is provided with slider 201 having a magnetic head (not show in the drawing) mounted to an underside surface at one end of it.

In addition, magnetic recording medium 207 is so disposed that it is spun by spindle motor 209. During writing and/or reading operation in the magnetic disk drive 250, the magnetic head mounted to the slider 201 levitates above the magnetic recording medium 207, as it receives a certain amount of levitation associated with a levitational force due to airflow generated by spinning of the magnetic recording medium 207 and a thrusting force of the plate spring 203 which shifts the slider 201 toward the magnetic recording medium 207.

This structure of the head supporting device 208 is such that it rotates about rotation shaft 205 by an interaction of voice coil 206 disposed to the support arm 204 during writing and/or reading operation, so that the magnetic head mounted to the slider 201 is positioned to a desired track on the magnetic recording medium 207, and performs the writing and/or the reading.

In the magnetic disk drive 250 of the prior art, the so-called load/unload mode (hereinafter referred to as L/UL mode) has been adopted in general as a system of the head supporting device 208 in order to attain high resistance to shock, which is thought to be indispensable for the device with portability.

In FIG. 14, the head supporting device 208 rotates about the rotation shaft 205, and the slider 201 moves outside of the magnetic recording medium 207, when the magnetic disk drive 250 comes to a stop. There is head retainer 211 having tapered portion 210 disposed to a position outside of the magnetic recording medium 207. When the magnetic disk drive 250 is at a standstill, guide 200 constructed on a tip of the suspension 202 rides up on the tapered portion 210 formed on the head retainer 211. This structure can thus prevent adhesion of the magnetic head mounted to the slider 201 with the magnetic recording medium 207.

By using the head supporting device 208 of such system (i.e. L/UL mode), the magnetic head and the magnetic recording medium 207 can be kept separated when the magnetic disk drive 250 is at a standstill. As a result, it could reduce a possibility that the magnetic head comes in contact to the magnetic recording medium 207 and causes mechanical and/or magnetic damage as compared to other systems even when there is any impact and the like from the outside.

However, the magnetic disk drive 250 equipped with the head supporting device 208 of the L/UL mode requires a thickness of the head retainer 211 in addition to thicknesses of the magnetic recording medium 207, the spindle motor 209 defining rotating means thereof, and the head supporting device 208. These thicknesses have been the obstacles in realizing a further reduction in thickness of at the disk drive, for instance, from the size of the Compact Flash to the size of the Memory Stick (i.e. 2.8 mm thick) or the size of the SD memory card (i.e. 2.1 mm thick).

There are also cases of using a system called contact start/stop mode (hereinafter referred to as CSS mode) as another system for achieving the thickness reduction. This system is designed to hold the magnetic head mounted to the slider in a position to remain in contact with the magnetic recording medium when the magnetic recording medium stops spinning. This system is suitable for reduction of the thickness since it does not require the so-called head retainer. However, this system has also had a problem in its resistance to shock because of the structure, in which the suspension is constructed of a material of low rigidity, that the magnetic head and/or the slider collide many times with the magnetic recording medium, thereby giving rise to a possibility that the magnetic head and/or the slider cause mechanical and/or magnetic damages to the magnetic recording medium when there are impacts and the like to the magnetic disk drive from the outside while it is at a standstill.

As discussed, there has not been suggested at all any technique that materializes all four features of downsizing, low-profiling, expanding storage capacity and high resistance to shock, in the art associated with the conventional magnetic disk drive.

In addition, there has not hitherto been suggested any technique for magnetic disk drives that realizes reduction in thickness particularly to such sizes as the Memory Stick and SD memory card.

SUMMARY OF THE INVENTION

A disk drive of the present invention comprises: a spinnably supported recording medium; spinning means for spinning the recording medium; a head supporting device provided with a support arm and a head mounted to an underside surface at one end of the support arm, the support arm disposed in a rotatable manner about a bearing unit in a radial direction of the recording medium; rotating means for rotating the support arm in the radial direction of the recording medium; control means electrically in connection with the head, the spinning means and the rotating means, for exchanging a signal with the head, controlling spinning of the recording medium, and for controlling rotation of the support arm; and a housing containing the recording medium, the spinning means, the head supporting device and the control means, wherein the housing has an exterior thickness of less than 3.3 mm.

With the foregoing structure, there is realized the disk drive having a shape compatible with the memory card in a size thinner than the Compact Flash.

Further, the disk drive of the present invention comprises: the spinnably supported recording medium; the spinning means for spinning the recording medium; the head supporting device provided with a support arm and a head mounted to an underside surface at one end of the support arm, the support arm disposed in a rotatable manner about the bearing unit in the radial direction of the recording medium as well as a perpendicular direction to a writing surface, the head supporting device further having first resilient means for impressing a thrusting force on the support arm in a direction toward the recording medium and second resilient means for turning the support arm in a direction away from the writing surface of the recording medium; first rotating means for rotating the support arm in the radial direction of the recording medium; second rotating means for thrusting the support arm in a manner to turn it in the perpendicular direction to the writing surface of the recording medium; and control means electrically in connection with the head, the spinning means, the first rotating means and the second rotating means, for exchanging a signal with the head, controlling spinning of the recording medium, and for controlling rotation of the support arm.

With the structure as described above, there is provided the head supporting device having an extremely high resistance to shock, high responsivity, and capability of making a high speed access, even if a shock is impressed from the outside, since a part constituting the support arm can be formed with a highly rigid material and the thrusting force of the resilient means to the slider can be set freely as desired, and also since the resonance frequency can be increased, because of the structure in which the part having rigidity and the other part having resiliency can be provided independently with respect to each other.

In addition, it also provides the disk drive with a very superior resistance to shock, since the head supporting device is constructed to be freely turnable in the perpendicular direction, and the head for the recording medium can be held with a clearance away from the recording medium while the recording medium is at a standstill.

Furthermore, because the second rotating means turns the support arm toward the direction away from the writing surface of the recording medium to separate the head and the recording medium when the recording medium stops spinning, it does not require to newly compose a head retainer separately for retracting the head, and thereby providing the disk drive of low-profile while also superior in resistance to shock that has not hitherto been available.

Moreover, since there is provided the housing containing the recording medium, the spinning means, the head supporting device and the control means, and that the housing is less than 3.3 mm in thickness of the exterior dimensions, it can compose the disk drive that is superior in resistance to shock and feasible for reduction of the thickness.

Also, the first resilient means of the head supporting device comprises a plate spring placed between the bearing unit and the support arm, so as to readily provide the head supporting device of a thin structure in the direction perpendicular to the recording medium, thereby accomplishing a reduction in the thickness of the disk drive.

In addition, the second resilient means of the head supporting device comprises a plate spring for depressing the other end of the support arm toward the recording medium so as to provide easily the head supporting device of a thin structure in the direction perpendicular to the recording medium, and thereby accomplishing further reduction in the thickness of the disk drive.

Furthermore, the bearing unit of the head supporting device is provided with a pivot pedestal having a pair of bosses in a manner to contact with the support arm, and the support arm is turnable in the direction perpendicular to the writing surface about a fulcrum served by points where the bosses on the pivot pedestal abut on the support arm. This realizes the bearing unit of such a structure that is simple, reducible in the thickness, and high rigidity.

Moreover, the pair of bosses provided on the pivot pedestal of the head supporting device are so arranged that they abut upon the support arm on a phantom line that is perpendicular to both an axial direction of the bearing unit and a longitudinal direction of the support arm, and also traverses a rotational center of the bearing unit in the radial direction of the recording medium. Accordingly, there can be provided the disk drive equipped with the head supporting device well-balanced in weight along the longitudinal direction of the support arm while also superior in the resistance to shock.

In addition, the bosses on the pivot pedestal of the head supporting device are each arranged in positions that are symmetrical to each other with respect to a centerline along the longitudinal direction of the support arm. This can provide the head supporting device with a good balance in weight along a widthwise direction of the support arm and an outstanding resistance to shock.

Moreover, a gimbals mechanism is disposed to the support arm for freely supporting the slider of the head supporting device in a rolling direction as well as a pitching direction. The structure enables the gimbals mechanism to absorb an undesired tilt of the slider with respect to the recording medium in the rolling and the pitching directions during writing and/or reading operation of the disk drive.

Also, the first rotating means of the head supporting device comprises a voice coil motor formed in the support arm, so as to make possible an even faster rotational movement.

Further, the second rotating means of the head supporting device comprises a solenoid, which makes possible an even faster turning movement with a simple structure.

In addition, because the head supporting device is so constructed that a center of gravity of a portion held by the resilient means is coincident with a point of intersection of a rotational axis of the support arm in the radial direction of the recording medium and another rotational axis in the direction perpendicular to the writing surface of the recording medium, it reduces undesired vibrations of the support arm to a minimum level possible even when there are any shocks and the like from the outside.

Next, another disk drive of the present invention comprises: a spinnably supported recording medium; spinning means for rotatory driving the recording medium; a support arm supporting a slider having a head mounted thereto for writing to and/or reading from data on the recording medium; rotating means for rotating the support arm about a bearing unit; and a housing supporting and containing the afore-said components, wherein a shape of the housing is defined based on a first straight line tangent to both an outermost rim of the rotating means and an outer periphery of the recording medium, and according to a quadrilateral comprised of the first straight line, a second straight line tangent to the outer periphery of the recording medium and perpendicular to the first straight line, a third straight line tangent to the outermost rim of the rotating means and perpendicular to the first straight line, and a fourth straight line tangent to the outer periphery of the recording medium and parallel with the first straight line.

With this structure, the housing of a smallest possible size can be made available when a diameter of the recording medium and an outer diameter of the rotating means are prescribed according to the designed storage capacity and/or rotational torque. It thereby realizes the disk drive of small size and low profile.

In addition, a wiring circuit is disposed to an interior side surface of a cover constituting the housing, and electric circuit components are mounted to the wiring circuit in an area other than that corresponding to a moving range of the support arm. An overall thickness can be reduced by disposing the electric circuit components on the surface of the housing cover, as opposed to the prior art structure, in which the components are mounted on an exterior surface of the housing or on another circuit board and overlaid on the housing. For instance, a wiring circuit may be formed by printing method on the surface of the cover, and semiconductor integrated circuits (LSI's), i.e. the main constituent elements among the electric circuit components, are mounted as bare chips to this wiring circuit. By adopting the bare-chip mounting as described above, not only can it decrease a mounting area of the electric circuit components, but also reduce the thickness substantially, and thereby it allows the LSI's mountable even in a space between the recording medium and the cover surface.

In addition, a number of processes for the mounting can be reduced by using sealant or the like to seal up the base and the cover to constitute the housing, since it can make resin coating unnecessary for protecting the components even if they are bare-chip mounted. Beside the printing method, the wiring circuit on the cover surface can be formed by film evaporation process, or a separate printed wiring board may be bonded. Furthermore, all of the LSI's need not be mounted in bare chip, but package type LSI's may be used in an area where a sufficient space is available for mounting.

Further, a flexible wiring board is used for connection between at least one of the spinning means, the magnetic head and the rotating means disposed to the base constituting the housing and the wiring circuit disposed to the cover surface, so as to simplify a number of assembling processes, since the assembly can be made only by fixing the cover to the base in a manner to fold them together after the electric circuit components are mounted with the cover in its opened position.

Moreover, the connection between at least one of the spinning means, the magnetic head and the rotating means disposed to the base constituting the housing and the wiring circuit disposed to the cover surface may be made by press-contact or press-fitting between a terminal formed on the base and another terminal formed in the corresponding position on the cover. This allows a process of assembling the spinning means, the magnetic head, the rotating means and the like to be mounted on the base can be made completely separately from the process of mounting the electric circuit components to the wiring circuit on the cover. In addition, since this allows the connection by press-contact or press-fitting to the wiring circuit at the same time the base and the cover are integrated with sealant, it simplifies the process of assembly while it also avoids contamination in the interior of the housing.

Besides, a skew angle of the slider is adjusted to 0 degree at a position in the innermost perimeter within a writing area of the recording medium, so as to give the slider an enough amount of levitation even at the innermost position on the recording medium where a peripheral speed becomes the smallest. In addition, the support arm can be so arranged as not to come into contact with the housing even when it is rotated to the outermost perimeter of the recording medium or onto the head retainer. Thus, this realizes miniaturization while also increasing the storage capacity.

The recording medium in a discoidal shape is so constructed that it has no through hole in the center, and a recording layer is formed only on one side of its surfaces, so as to allow the support arm rotatable up to the center area of the recording medium. Accordingly, a large capacity of storage can be materialized even if a size of the recording medium is reduced, since the recording medium can be used by extending the writing area farther toward the inner area as compared to the prior art device.

The recording medium of the discoidal shape without a through hole in the center has such a structure that the recording layer is formed on one side surface and the other surface is provided with a shaft in the center for pivotally fitting into a hub of the spinning means. The recording medium provided with the unitary shaft makes unnecessary a separate spin base for seating the recording medium, so as to reduce the thickness as well as a number of the component parts. In addition, the recording medium can be used more effectively up to the inner area for the writing surface, while also achieving the large capacity of storage even if size of the recording medium is reduced.

In this instance, the thickness of the disk drive can be reduced further since a rotor of the spinning means can be integrated with the recording medium by disposing a permanent magnet around the shaft on the same side surface in a manner to face a stator of the spinning means.

In addition to the above, the recording medium can be used more effectively up to the inner area as the area for writing, while achieving the large capacity of storage even if size of the recording medium is reduced.

With the present invention, there is accomplished the disk drive with the housing having an external shape of approximately 24 mm in width and approximately 32 mm in length.

It also realizes the disk drive having the storage capacity of at least 1 Gigabyte.

Additionally, it realizes the disk drive having the housing of which an external thickness is approximately 2.1 mm with this invention.

It also realizes the disk drive having the storage capacity of at least 1 Gigabyte.

With the present invention, since there is realized the disk drive which is thinner and superior in resistance to shock than the prior art device, and capable of making a high-speed access, it can provide the disk drive that is thin and small in size, outstanding in portability, and compatible in external dimensions of the housing with that of the SD memory card.

According to the foregoing structure, what can be realized is the low-cost disk drive having the shape mountable to a portable information device, and yet a larger capacity than semiconductor memory cards and the like. Although the thickness of the disk drive may be changed depending on construction of the recording medium and the spindle motor, it can be reduced to 3 mm for the structure, for instance, wherein the rotor and the recording medium are integrated, or even to 2.1 mm when the electric circuit is mounted into a space within the housing.

DESCRIPTION OF THE PREFERRED EMBODIMENTS

First Exemplary Embodiment

Figure 1:
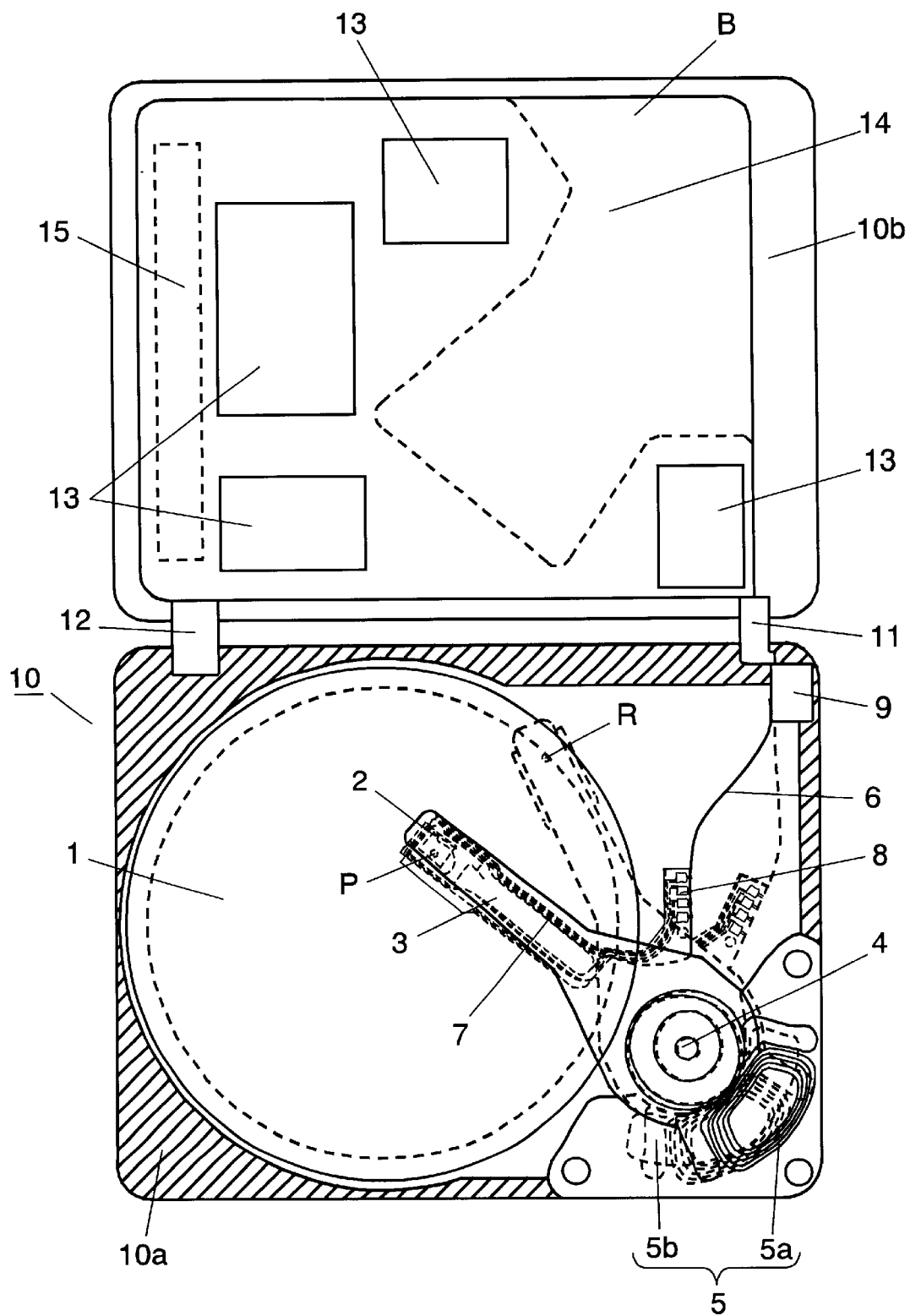
FIG. 1 is a plan view depicting a disk drive according to a first exemplary embodiment of the present invention with a cover in an open position.

FIG. 1 is a plan view of a disk drive according to a first exemplary embodiment of the present invention, with a cover in its open position. In this exemplary embodiment, magnetic recording medium 1 has a discoidal shape, provided with a magnetic recording layer formed entirely on one of its surfaces, and it is fixed to a rotor of spinning means (not show in the figure) disposed under the magnetic recording medium 1, so as to be freely spinnable by the spinning means.

Figure 2:
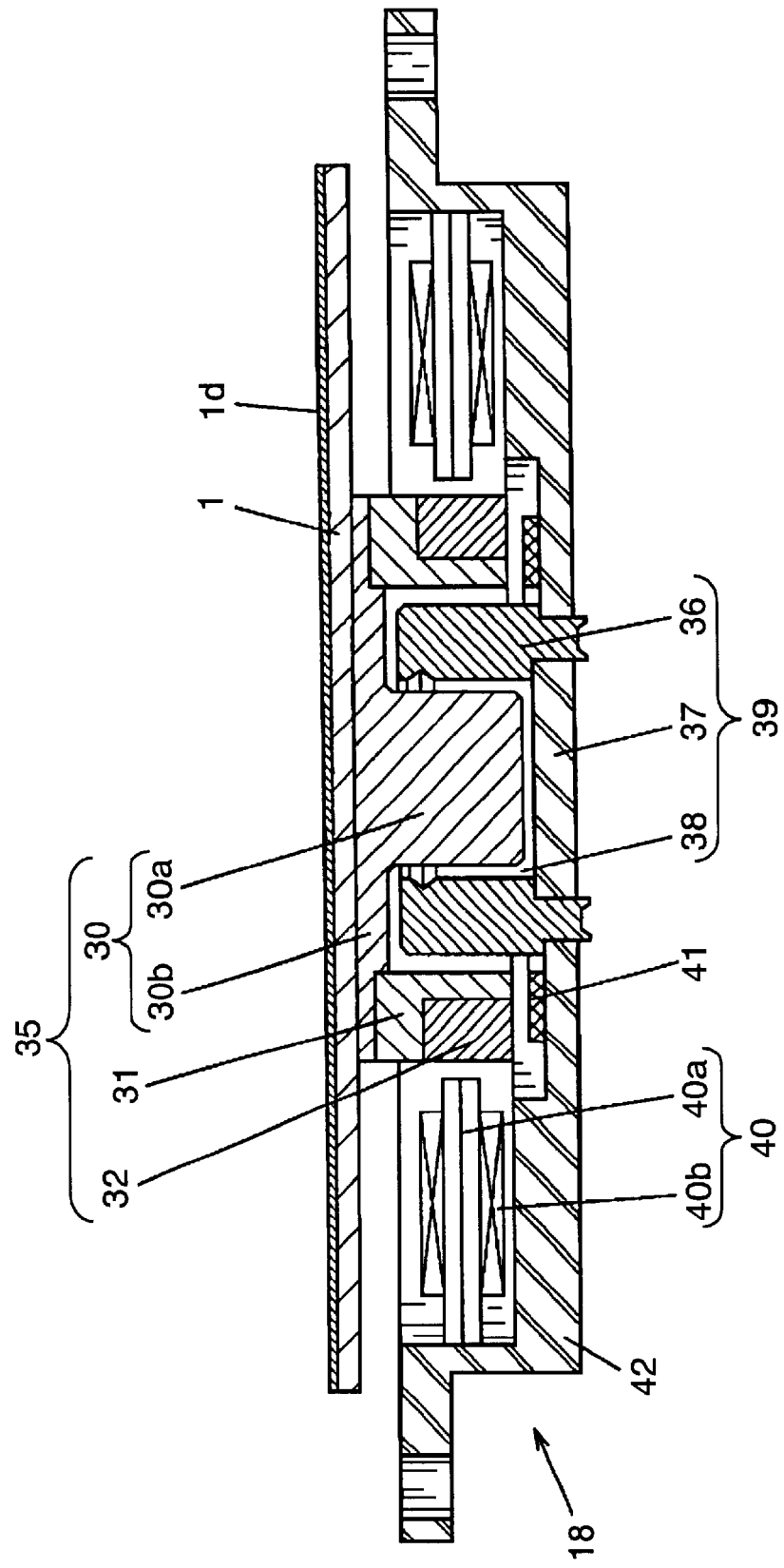
FIG. 2 is a sectional view of the disk drive of the first exemplary embodiment of this invention, showing a recording medium secured to a position on spinning means.

FIG. 2 is a sectional view depicting the magnetic recording medium 1 engaged to spinning means 18. The magnetic recording medium 1 has magnetic recording layer 1d formed on one of the surfaces, and it is bonded to spin base 30 of rotor 35 of the spinning means 18 with adhesive or the like. The spinning means 18 comprises the rotor 35, stator 40, hub 39 of the spinning means, attractor 41 for attracting the rotor 35 and motor frame 42 for fixing these components in their prescribed positions. The rotor 35 comprises the spin base 30 consisting of shaft 30a and flange 30b, and cylindrical magnet 32 fixed to a lower edge of the flange 30b with back yoke 31 therebetween.

Further, the stator 40 comprises iron core 40a and coil 40b wound around the iron core 40a, and it is bonded to the motor frame 42 with adhesive or the like. The hub 39 in the spinning means comprises radial bearing 36 and thrust bearing 37 to constitute a dynamically-pressurized fluid bearing having a space around the shaft 30a filled with lubricant 38. A thin structure of the bearing is thus realized. A surface of the magnetic recording medium 1 can be formed flat by bonding the magnetic recording medium 1 to the spin base 30 so as to make support arm 3 freely rotatable to a center area of the magnetic recording medium 1 as shown in FIG. 1.

In FIG. 1, slider 2 bearing a magnetic head (not show in the figure) is mounted via a gimbals spring, for instance, to a surface of the support arm 3 confronting the magnetic recording medium 1. The support arm 3 is rotatably supported by the bearing unit 4, and rotating means 5 is disposed to the support arm 3 at a side opposite the slider 2 for rotating itself. A voice coil motor, for example, may be used as the rotating means 5. In this example, the rotating means 5 is fixed to the support arm 3, and it comprises coil 5a for providing the support arm 3 with a force to rotate it about the bearing unit 4, and yoke 5b formed integrally with a permanent magnet and secured to base 10a.

A housing of the magnetic disk drive in this exemplary embodiment is defined using the magnetic recording medium 1 and the rotating means 5.

Figure 3:
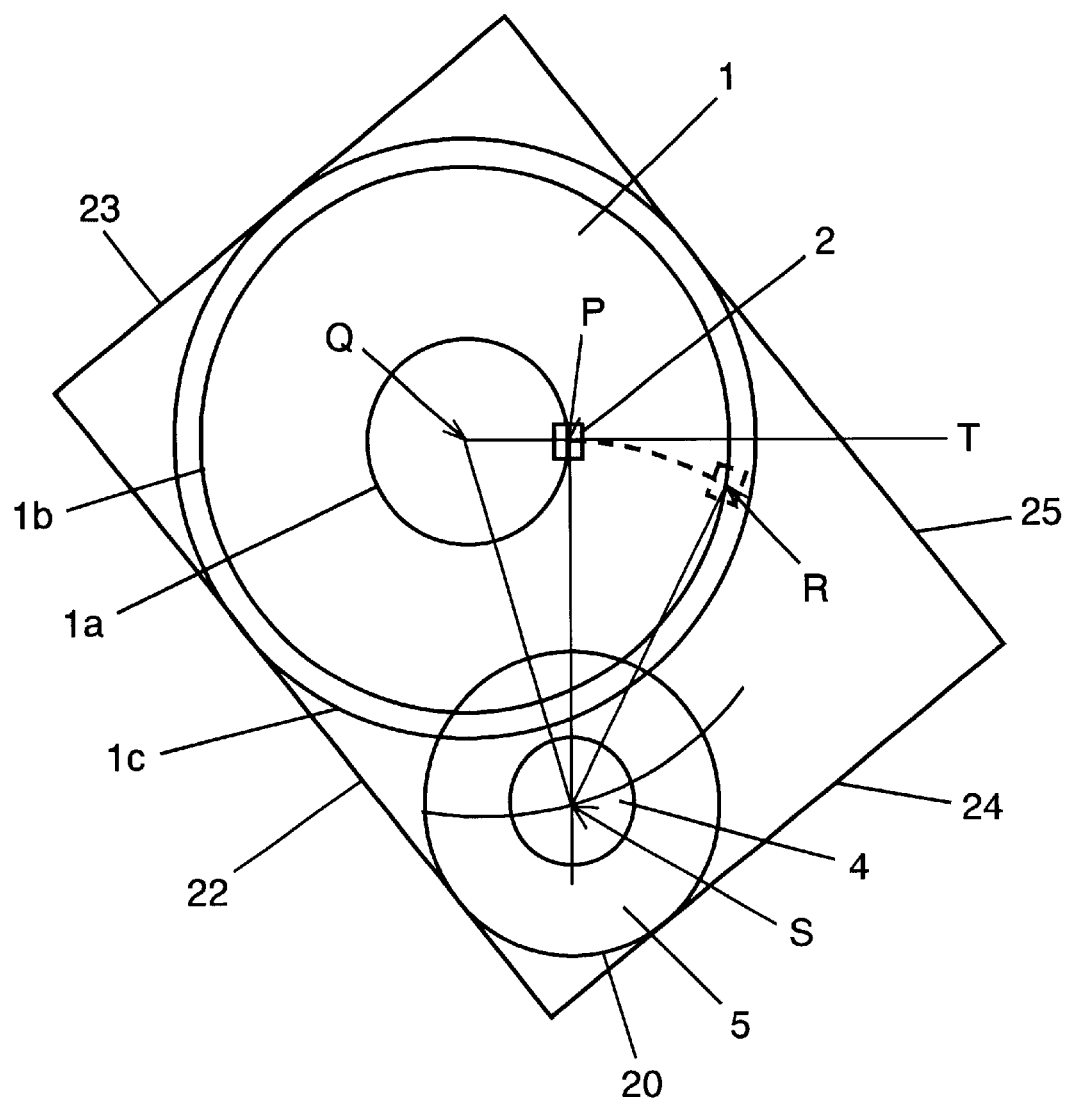
FIG. 3 is an expository illustration defining an external shape of housing in the disk drive of this invention.

A method of defining an external shape of the housing using the magnetic recording medium 1 and the rotating means 5 will be described hereinafter with reference to FIG. 3.

The bearing unit 4 is placed in such an arrangement that a skew angle of the slider 2 becomes 0 degree when the slider 2 is at an intersecting point P between a radial line Q–T drawn from the center Q of the magnetic recording medium 1 and an innermost perimeter 1a of the writing area. For this arrangement, the center of the bearing unit 4 can be simply located at an intersection S between a straight line through the intersection P and perpendicular to the radial line Q–T, and a circumference of a circle drawn from the center Q of the magnetic recording medium 1 with a radius equal to a length Q–S obtained by adding the radius of the magnetic recording medium 1, the radius of the bearing unit 4 and a clearance given between the magnetic recording medium 1 and the bearing unit 4.

With the foregoing arrangement, the skew angle becomes 0 degree when the slider 2 is at the innermost perimeter 1a of the magnetic recording medium 1, and the sufficient amount of levitation can be ensured even though a peripheral speed is small. When the slider 2 is at the outermost perimeter 1b of the magnetic recording medium 1, on the other hand, both the peripheral speed and the skew angle increase. Hence, they cancel each other out to avoid an excessive degree of the levitation. In addition, a variation in the amount of levitation can be reduced by adjusting a shape of a surface of the slider 2 confronting the magnetic recording medium 1. The writing area can be thus expanded to make the best possible use of the diameter of the magnetic recording medium 1, by combining the foregoing techniques to control the variations in amount of the levitation between the innermost perimeter and the outermost perimeter.

Furthermore, a tip end of the support arm 3 can be kept away in good distance from the housing than an outer periphery of the magnetic recording medium 1, even when the support arm 3 is rotated to such a position that the slider 2 is located at the peripheral side (at a point R shown by a dotted line in the figure) of the magnetic recording medium 1 or even to a head supporting member (not show in the figure) outside of the outer periphery. Thus, there is no influence to the shape of the housing even if the support arm 3 is designed to be rotatable up to the peripheral side.

The external shape of the housing is defined in the following manner. That is, straight line 22 is determined first as a reference line, which is tangent to both the outermost rim 20 of the rotating means 5 rotatable about the bearing unit 4 and the outer periphery 1c of the magnetic recording medium 1. A quadrilateral is then configured by giving a straight line 23 perpendicular to the straight line 22 and tangent to the outer periphery 1c of the magnetic recording medium 1, another straight line 24 also perpendicular to the straight line 22 and tangent to the outermost rim 20 of the rotating means 5, and another straight line 25 parallel with the straight line 22 and tangent to the outer periphery 1c of the magnetic recording medium 1, so that this quadrilateral is determined for use as a basis of the housing.

A housing of 24 mm wide is sufficient to therein house the magnetic recording medium 1 having an outer diameter of approximately 23 mm, when the housing is formed by providing a clearance of approximately 100 μm, for example, at every point of tangency, and a thickness of approximately 0.4 mm for walls around the points of tangency.

In addition, a length of the housing 10 can be reduced to a minimum, since the rotating means 5 rotatable about the bearing unit 4 and the magnetic recording medium 1 are disposed at an angle to the housing 10. The length can be set to approximately 32 mm in an instance that the magnetic recording medium 1 is 23 mm in outer diameter, the bearing unit 4 is 5 mm in diameter, the outermost rim 20 of the rotating means 5 is 6 mm in radius from the center of the bearing unit 4, and the housing has a clearance of approximately 100 μm to every point of tangency and the wall thickness of approximately 0.4 mm for the portions around the points of tangency.

When the magnetic recording medium 1 used is 23 mm in the outer diameter and not provided with a through hole in the center as discussed in this exemplary embodiment, there can be ensured the writing area having an inner perimeter of 4 mm in radius and an outer perimeter of at least 10 mm in radius. In this instance, as large a number of data tracks as approximately 11,800 are made available. Although a track recording density is dependent upon performance capabilities of the magnetic recording medium and the magnetic head, a storage capacity of approx. 1 Gigabyte is achievable even with ordinary magnetic recording medium and magnetic head of the current level of technology when the aforesaid number of tracks is available.

As a result, the magnetic disk drive having the storage capacity of approximately 1 Gigabyte can be realized even though it is so small as having the housing of 32 mm long by 24 mm wide.

Referring back to FIG. 1, described next pertains to a structure in which electric circuit components 13 are mounted to cover 10b of the housing 10. Flexure wire 7 for communicating a signal to and from the magnetic head (not show in the figure) mounted to the slider 2 is routed through the support arm 3, and connected to flexible wiring board 6 via wiring connector 8 attached to the support arm 3. The other end of this flexible wiring board 6 is secured to fixture 9 disposed to the base 10a. This fixture 9 may be provided with a signal processor circuit so as to assign it a part of the signal processing task. In addition, another wire for supplying electric power to coil 5a of the rotating means 5 is routed over the support arm 3 and the bearing unit 4, and connected in the similar manner to the flexible wiring board 6 with the wiring connector 8.

A position representing the innermost perimeter of the writing area on the magnetic recording medium 1 is shown by the slider 2 when it is located at the point P, and a position representing the outermost perimeter on the magnetic recording medium 1 is shown when it is location at the other point R, where the support arm 3 and the rotating means 5 are illustrated with a dotted line. Since the skew angle of the slider 2 is set to be 0 degree at the position of point P, there is no possibility that the tip end of the support arm 3 comes into contact with the housing 10 even when the slider 2 rotates to the point R or beyond the outer periphery of the magnetic recording medium 1 into an area over the base 10a, as is obvious from the figure.

Electric circuit components 13 for controlling the magnetic head (not show in the figure), the rotating means 5 and the spinning means (also not show in the figure) and for processing signals are mounted on wiring circuit 14 formed on a surface of the cover 10b facing the magnetic recording medium 1. Connections between the wiring circuit 14 and the above-said magnetic head, the spinning means and the rotating means 5 are made by first flexibly-connect wiring board 11 extending from the fixture 9 and second flexibly-connect wiring board 12 extending from the base 10a at a location diagonally opposite the bearing unit 4. The wiring circuit 14 to be formed on the surface of the cover 10b can be made easily into any prescribed pattern using a printing method, for example. Moreover, the wiring board is also adaptable to bare-chip mounting of LSI's. As the wire bonding method, flip-chip method, and the like are some of examples useful for the bare-chip mounting, a thickness of 300 μm or less is attainable for the portion bearing the electric circuit components 13 if the LSI's are mounted after being ground to 150 μm or less in the thickness. The wiring circuit 14 may be formed on an entire surface of the cover 10b since it can be formed into a thickness of approx. 100 μm or less by using the printing method or the thin-film evaporation method. Or, it is desirable that the wiring circuit 14 is placed only in an area other than area B that corresponding to a rotating range of the support arm 3 if it is formed by bonding a separate printed wiring board. Also, it is desirable to mount the electric circuit components 13 in the area other than the rotating range of the support arm 3 as shown in FIG. 1.

A hermetically sealed magnetic disk drive is thus constructed when the cover 10b carrying the electric circuit components 13 mounted thereon and the base 10a are bonded securely with sealant applied around their peripheries. In this exemplary embodiment, connection terminal 15 connected with the wiring circuit 14 is mounted to the base 10b for connection to an external circuit. This connection terminal 15 is tapped out of an exterior surface of the cover 10b, and it can be led out by a flexible wiring, for instance.

By constructing the foregoing structure, the disk drive of 1 Gigabyte in the storage capacity can be realized in the device size of approximately 24 mm wide by approximately 32 mm long. In addition, the disk drive can be reduced in its entire thickness to an extent saved by the electric circuit components built into the housing.

In this exemplary embodiment, the center of the bearing unit for the rotating means is located in the position that yields the skew angle of 0 degree. However, it is not restrictive specifically to the skew angle, but only the straight tangential lines need to be drawn as described above after determination of a diameter of the magnetic recording medium, a diameter of the outermost periphery of the rotating means and a distance to the rotating means from the center of the magnetic recording medium, in order to minimize the external shape of the housing.

Second Exemplary Embodiment

Figure 4:
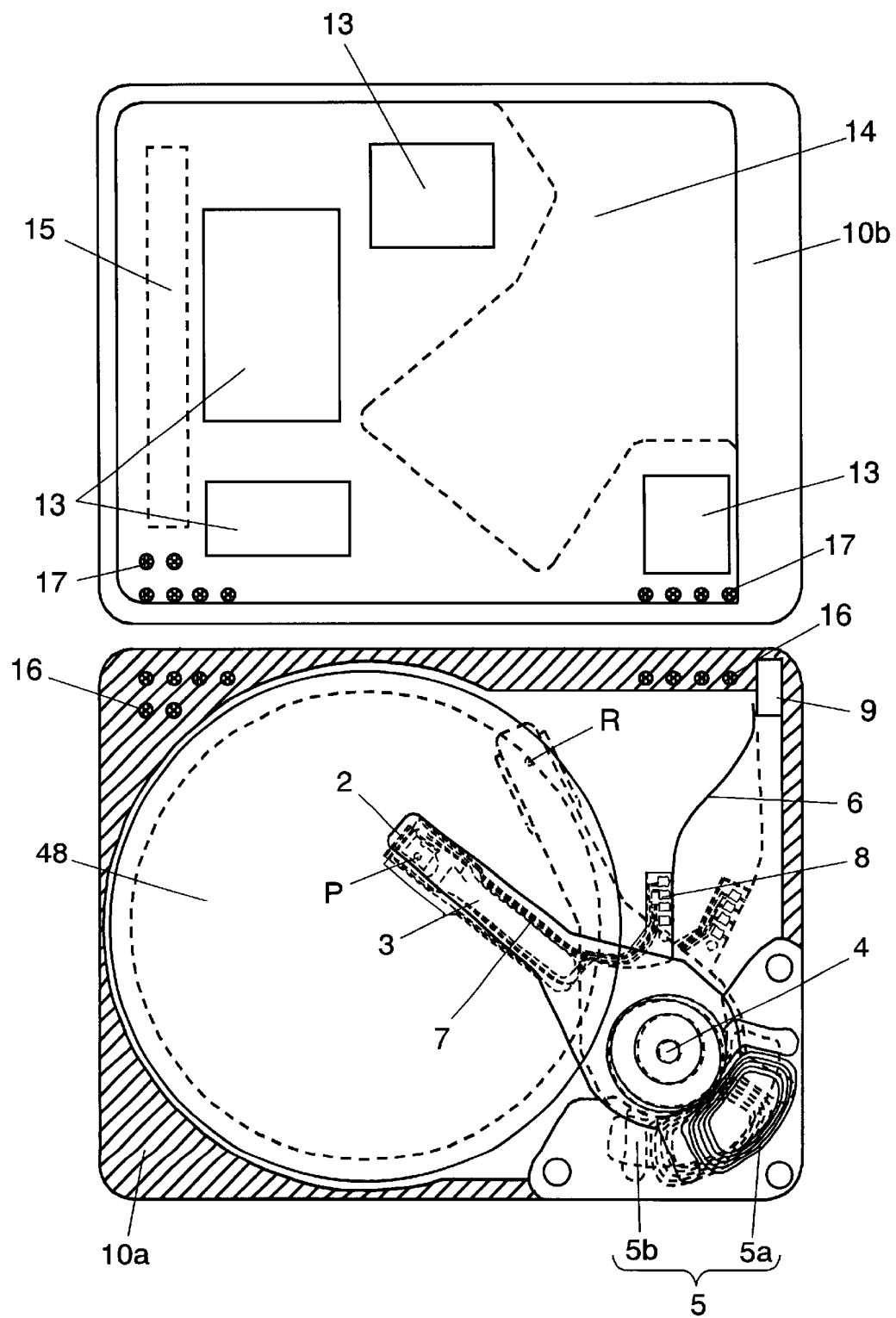
FIG. 4 is a plan view depicting a disk drive according to a second exemplary embodiment of this invention with a cover in an open position.

FIG. 4 is a plan view of a magnetic disk drive according to a second exemplary embodiment of this invention with a cover in its open position. A notable feature of this exemplary embodiment is that base 10a is provided with a spinning means (not show in the figure), rotating means 5, base side terminals 16 for connecting a magnetic head (not show in the figure) to electric circuit components 13 on cover 10b, and cover side terminals 17 disposed to a position corresponding to the base side terminals 16.

Figure 5:
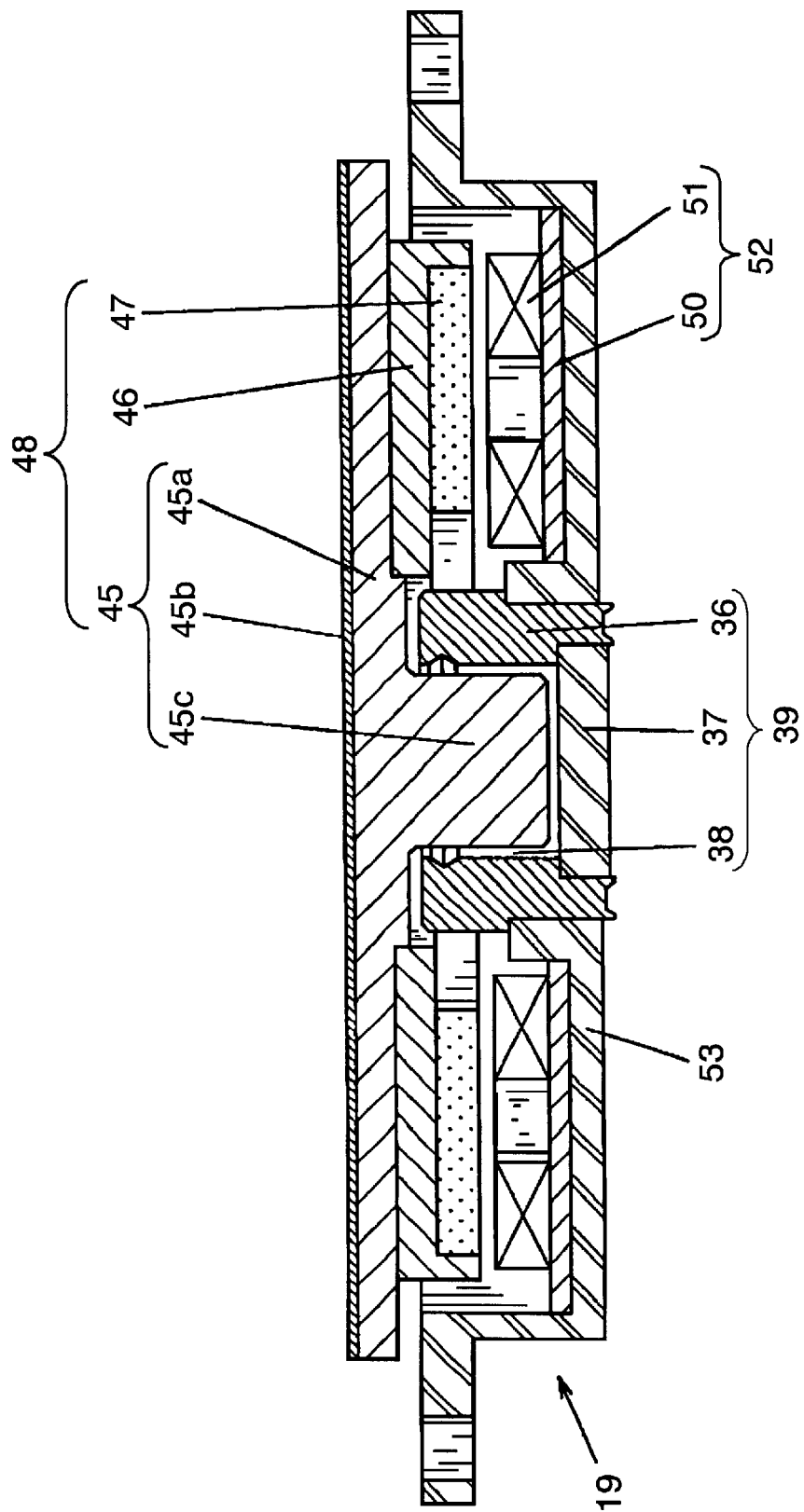
FIG. 5 is a sectional view of the disk drive of the second exemplary embodiment of this invention, showing a recording medium constructed integrally with spinning means.

Also, a magnetic recording medium is constructed integrally with a rotor of the spinning means 19 as shown in FIG. 5. That is, the rotor-integrated magnetic recording medium 48 comprises magnetic recording medium 45 with unitary shaft and annular shape permanent magnet 47 bonded to a side around shaft 45c through back yoke 46. In addition, the recording medium 45 with the unitary shaft has magnetic recording layer 45b formed on one of its surfaces of disk portion 45a, and shaft 45c in the center of the other surface. Stator 52 is constructed with coil 51 formed on soft magnetic substrate 50 in a position confronting the permanent magnet 47, and the stator 52 is bonded to motor frame 53 by adhesive or the like. Details of bearing unit 39 for spinning means is skipped since it is analogous to that of the magnetic disk drive of the first exemplary embodiment.

As described above, the magnetic disk drive of this exemplary embodiment is characterized by the structure in which the base 10a and the cover 10b are provided with the base side terminals 16 and the cover side terminals 17 respectively, and the magnetic recording medium 48 is constructed integrally with the rotor. Besides those described above, the structure is analogous to that of the first exemplary embodiment, and further details will therefore be skipped since like reference numerals are used throughout to designate like structural elements.

Among the base side terminals 16 in FIG. 4, those provided near the fixture 9 are connection terminals for the magnetic head and the rotating means 5, and those at a corner diagonally opposite the bearing unit 4 are connection terminals for the spinning means 19. In the like manner, there are also terminals provided on the cover 10b at locations corresponding to them. After the electric circuit components 13 are mounted, the cover 10b is pressed against and secured to the base 10a in a manner that the corresponding terminals match up, and the terminals are hence connected by press-contact to complete assembly of the magnetic disk drive.

In the magnetic disk drive of this exemplary embodiment, the base 10a and the cover 10b are not connected with a flexible wiring. Therefore, the base 10a and the cover 10b can be assembled and the components mounted completely separately from each other, so as not to contaminate the magnetic recording medium 48 and an interior of the base 10a during the mounting.

In addition, since the cover 10b can be cleansed thoroughly after the mounting, there will be no contaminant produced from within the cover 10b to contaminate a writing surface of the magnetic recording medium 48 after they are assembled.

In the described exemplary embodiment, although the terminals are connected together by press-contact, they may be replaced by pins formed on one side and pin holes in the other side so as to make the connections by inserting the pins into engagement with the pin holes. Further, although the terminals are disposed to one side along a longitudinal direction, they need not be limited specifically to this location. These terminals may be disposed freely to any locations other than the area where the magnetic recording medium 48, the support arm 3 and the like spins and/or rotates.

As regard to an external size of the housing of the disk drive, width and length measure 24 mm and 32 mm respectively, as same as that described in the first exemplary embodiment of this invention. In addition, it is capable of recording as large a capacity as 1 Gigabyte. On the other hand, an overall thickness of the magnetic disk drive can be reduced to 2.1 mm in this exemplary embodiment, since it employs the rotor-integrated magnetic recording medium 48 and the electric circuit is mounted within the housing. By reduction of the thickness to 2.1 mm, with 24 mm in width and 32 mm in length, it can be made compatible in size with the SD memory card which is a kind of semiconductor memory cards (it is also compatible in size with the Memory Stick, as needless to note).

Furthermore, although this second exemplary embodiment incorporates the rotor-integrated type magnetic recording medium, it may be constructed as such that the magnetic recording medium and the shaft are unitary formed, and the yoke and the permanent magnet are mounted to a rotary member of the spinning means, so that the yoke and the permanent magnet are coupled together into a one-piece structure when the shaft-integrated type magnetic recording medium is mounted to the spinning means.

Moreover, in the magnetic disk drives of the first and the second exemplary embodiments of this invention, a dynamically-pressurized fluid bearing is used as the drive shaft bearing of the spinning means. However, the present invention is not restrictive, and that other types of bearing unit such as metal bearing, ball bearing, and the like are also suitable for use.

Furthermore, what have been described in the first and the second exemplary embodiments are devices of the CSS (i.e. contact start-stop) mode of which the head slider stops on the surface of the magnetic recording medium when the magnetic recording medium stops spinning. However, a similar magnetic disk drive can be obtained even with the NCSS (non-contact start-stop) mode (L/UL mode, for example) having a head retainer disposed next to an outer periphery of the magnetic recording medium within the housing for retracting and retaining the slider.

Third Exemplary Embodiment

In a disk drive of this invention, it is preferable that it has a structure employing a head supporting device described below in order to make it thin and improve its resistance to shock.

As the third exemplary embodiment of this invention, a principle of operation of this head supporting device will be described as one example of head supporting device of a magnetic disk drive.

Figure 6:
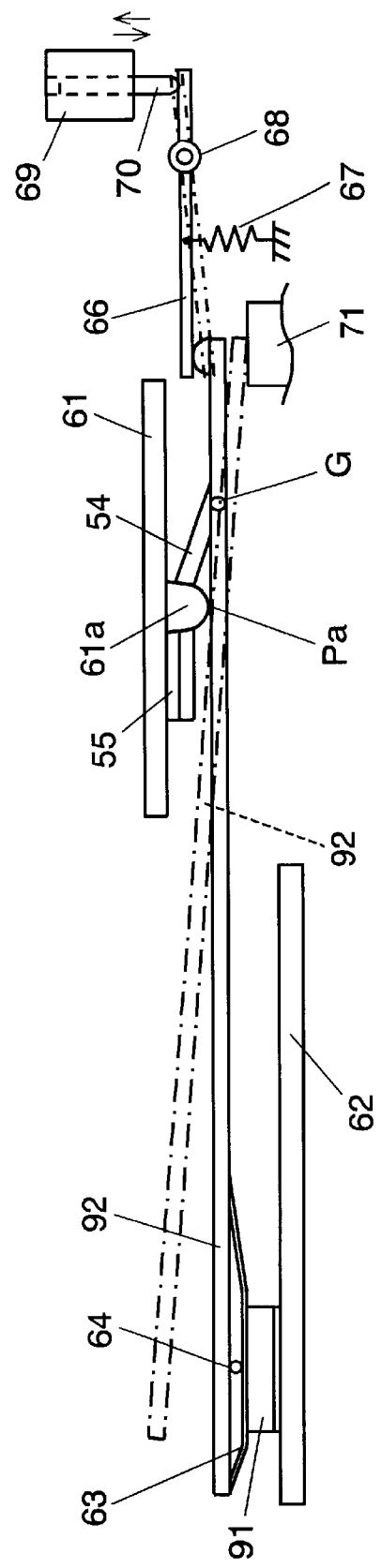
FIG. 6 is side view of a head supporting device according to a third exemplary embodiment of this invention, illustratively showing a principle of its operation.

FIG. 6 is a side view depicting a general structure of the head supporting device for the purpose of illustrating the principle of operation of the head supporting device mounted into the disk drive of this invention.

In FIG. 6, slider 91 provided with a magnetic head (not show in the figure) on an underside surface thereof is mounted to an underside surface at one end of support arm 92, which is then fixed at the other end portion to an end portion of plate spring 54 as shown in the figure. The other end portion of the plate spring 54 is fixed to pivot pedestal 61 via spring fixation member 55.

Accordingly, the support arm 92 is in such a configuration that it is flexibly secured to the pivot pedestal 61 via the plate spring 54.

Figure 7:
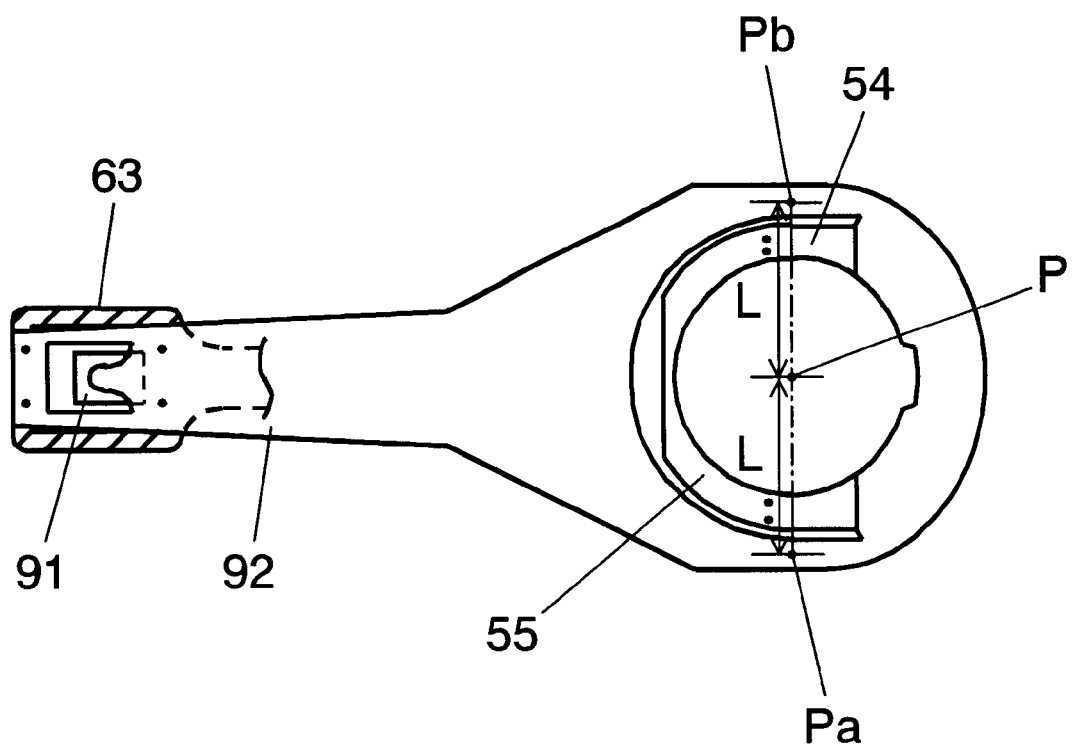
FIG. 7 is a plan view depicting a main portion of the head supporting device according to the third exemplary embodiment of this invention.

The pivot pedestal 61 and the support arm 92 abut upon each other, for which a detail will be described next with reference to FIG. 7. FIG. 7 is a plan view showing a main portion of the head supporting device of this invention.

The pivot pedestal 61 is provided with a pair of bosses 61a and 61b (not shown in FIG. 6), and their tips abut upon the support arm 92 at respective contact points Pa and Pb shown in FIG. 7, so that one end of the support arm 92 is thrust in a direction toward magnetic recording medium 62 by a resilient force of the plate spring 54, and a compressive stress is produced at each of the contacting points Pa, and Pb.

In this instance, a loading weight to the slider 91 is produced by the compressive stress by the individual bosses 61a and 61b of the pivot pedestal 61 to the support arm 92 in the direction toward the magnetic recording medium 62, when magnetic disk drive is in operation, or the slider 91 is levitating above the magnetic recording medium 62.

The bosses 61a and 61b are so arranged respectively on the pivot pedestal 61 that they abut on the support arm 92 along a line in phantom that is perpendicular to both a direction of a central axis of rotation, about which the support arm 92 rotates along a radial direction of the magnetic recording medium 62, and a longitudinal direction of the support arm 92, and that traverses the central axis of rotation.

In adopting this structure of the head supporting device, the support arm 92 can be formed with a material of high rigidity. Hence, this head supporting device can be constructed with the material of high rigidity in its entirety it from the pivot pedestal 61 to the individual bosses 61a and 61b of the pivot pedestal 61, and from a portion of the support arm 92 supported by the pivot pedestal 61 to another portion whereto the slider 91 is disposed.

By constructing the support arm 92 with the highly rigid material in the manner as described, not only can it improve resistance to shock upon external impacts and the like, but also increase a resonance frequency of the support arm 92. For this reason, there is not a possibility of any vibrating mode to occur which has been the problem of the past, and therefore making a settling operation unnecessary. This allows the support arm 92 to rotate and settle into a position quickly, thereby resulting in an increase in access speed of the magnetic disk drive.

Further, the plate spring 54 defining the resilient means is provided independently from the support arm 92, instead of being built into the structure of the support arm 92. This makes possible a selection of the plate spring 54 for the suitable strength and spring constant by simply changing the thickness, material, and the like of the plate spring 54.

Depending on a structure for using the head supporting device, it is desirable to arrange a center of gravity of a portion retained by the plate spring 54 to be at a position coincident with a point of intersection between the rotating axis of the support arm 92 in the radial direction of the magnetic recording medium 62 and another rotating axis in the direction perpendicular to the writing surface of the magnetic recording medium 62. In other words, the head supporting device is so designed that the center of gravity is placed at practically the same position as an intermediate point P on a line connecting in phantom between the points Pa and Pb where the support arm 92 and the bosses 61a and 61b of the pivot pedestal 61 abut upon each other (in FIG. 7, a distance from the point P to the point Pa and another distance from the point P to the point Pb are equal as are shown by a symbol L). This makes possible to provide the head supporting device with stability and limited vibrations to external shocks and the like. Although this is the case that can provide the head supporting device with the greatest resistance to shock, a deviation to certain extent does not present any problem for the practical purposes.

In the case of using a voice coil motor for rotating the support arm 92, the center of gravity discussed above is construed as a center of gravity of the support arm 92 including a voice coil and a coil holder mounted thereto.

In addition, the support arm 92 is provided with gimbals mechanism 63, and the slider 91 is supported with dimpled boss 64 formed on an underside surface at one end of the support arm 92, as shown in FIG. 6, so as to realize the head supporting device having flexibility responsive to undesirable vibrations and the like of the slider 91 in a rolling direction as well as a pitching direction with respect to the magnetic recording medium 62 during operation of the magnetic disk drive.

In the head supporting device to be mounted to the disk drive of the present invention, as described, a number of conflicting requirements such as increasing the loading weight to the slider 91, improving the flexibility, and increasing rigidity of its structure can be achieved independently as separate factors of the individual structural elements. Accordingly this can simplify design of the head supporting device and also expand remarkably a degree of flexibility in the design.

Furthermore, in the head supporting device to be mounted to the disk drive of this invention, a very precise forming process (e.g. bending process) is not required for the plate spring as has been needed in the conventional device. Therefore, the head supporting device can be manufactured easily as compared to the conventional device.

In FIG. 6, the support arm 92 is constructed to be turnable in the direction perpendicular to the magnetic recording medium 62 with a downward pressure impressed on one end of the support arm 92 opposite the slider 91 by an end of depression means 66.

The depression means 66 is retained in a rotatable manner in the perpendicular direction to the magnetic recording medium 62 by shaft 68 disposed in an orientation orthogonal to a longitudinal direction of the support arm 92 as well as parallel to the writing surface of the magnetic recording medium 62. Solenoid pin 70 is thrust downward by function of solenoid 69 disposed to the other end of the depression means 66, to push down the other end.

Besides, the depression means 66 is pulled downward in the figure by resilient means 67 provided at the left side of the shaft 68. On the other hand, the depression means 66 receives a downwardly pressing force in the figure at its right side of the shaft 68 by the function of the solenoid 69 with the solenoid pin 70. A relation between the pulling force and the pressing force determines an orientation of the depression means 66. In other words, an angle of the depression means 66 with respect to the magnetic recording medium 62 is determined by turning the solenoid 69 on or off, and thereby establishing an angle of the support arm 92 with respect to the magnetic recording medium 62.

By adopting the foregoing structure, the support arm 92 can be turned in the perpendicular direction with respect to the magnetic recording medium 62 by the function of the solenoid 69.

The head supporting device to be mounted into the disk drive of the present invention operates in a manner which will be described next with reference to FIG. 6 and FIG. 7.

When the magnetic recording medium 62 is caused to stop spinning, the electric current supplied to the solenoid 69 is turned off. As a result, the depression means 66 moves down toward the magnetic recording medium 62 because the solenoid pin 70 is maintained vertically movable, and the support arm 92 is held to stay in a position shown by a dashed line in FIG. 6.

In addition, stopper 71 is provided in a such manner and position that one end of the support arm 92 opposite the other end where the slider 91 is formed abuts upon the stopper 71, when it is pushed downward. Since the support arm 92 is held abutted upon the stopper 71 in this position, it can achieve a high resistance to shock.

Next, when the magnetic recording medium 62 starts spinning in the reading or writing operation, electric current is supplied to the solenoid 69. This pushes down the solenoid pin 70, to reduce the pressing force of the depression means 66 to the support arm 92. As a result, the depression means 66 and the support arm 92 are maintained with a small spacing therebetween, and the support arm 92 stays in a such state that it is held flexibly by the pivot pedestal 61 via the plate spring 54.

Accordingly, the slider 91 levitates by a force derived relative to the thrusting force placed on the slider 91 toward the magnetic recording medium 62 and a levitational force in the opposite direction. This causes the plate spring 54 to deform, and the magnetic reading and/or writing is performed while maintaining a constant clearance between the magnetic head and the magnetic recording medium 62.

In this instance, a reactive force to the deformation of the plate spring 54 acts as the loading weight impressed on the slider 91.

This loading weight can be adjusted by coordinating any of the material and thickness of the plate spring 54, a height of the pair of bosses 61a and 61b of the pivot pedestal 61, and a positional relation between a point G in FIG. 6, i.e. a linkage between the support arm 92 and the plate spring 54, and the point P.

For example, a larger loading weight can be impressed on the slider 91 by forming the plate spring 54 into a large thickness with a material of high rigidity. Alternatively, a larger loading weight can also be impressed upon the slider 91 by raising the bosses 61a and 61b of the pivot pedestal 61, or by bringing a position of the linkage point G between the support arm 92 and the plate spring 54 in FIG. 6 closer to the point P.

With an adoption of the foregoing structure, the head supporting device is able to maintain the clearance between the magnetic head and the magnetic recording medium 62 when the magnetic disk drive is at a standstill. Thus, there is realized the head supporting device of an extremely high resistance to shock, such that there is a remote possibility for the magnetic head and/or the slider 91 to mechanically and/or magnetically damage the magnetic recording medium 62 even when it receives any impact and the like from the outside.

Fourth Exemplary Embodiment

As a fourth exemplary embodiment of the present invention, disclosed next is a structure of a head supporting device of a magnetic disk drive of the invention, which realizes the principle of operation discussed in the third exemplary embodiment.

Figure 8:
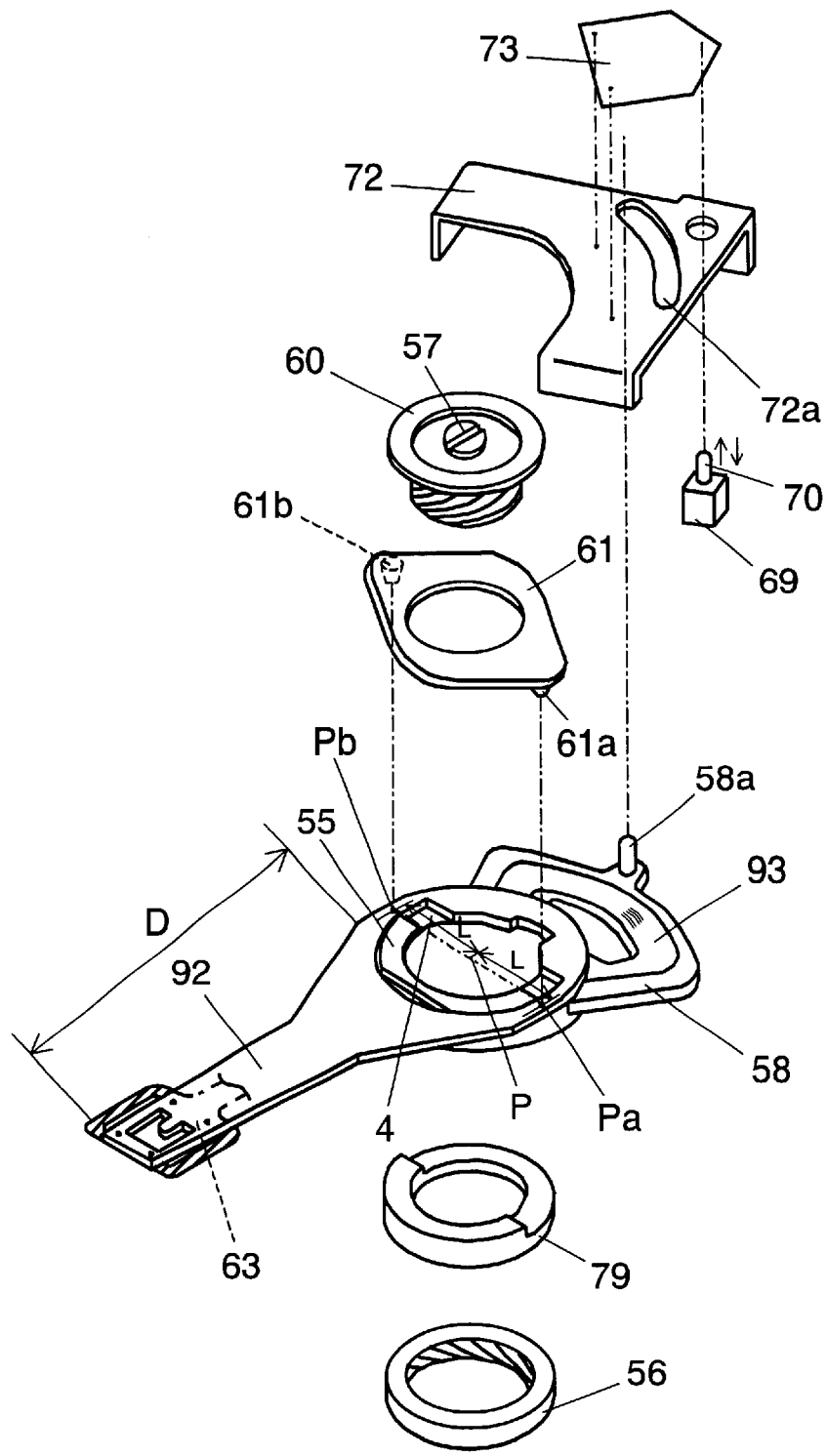
FIG. 8 is an exploded perspective view showing a structure of a head supporting device according to a fourth exemplary embodiment of this invention.
Figure 9:
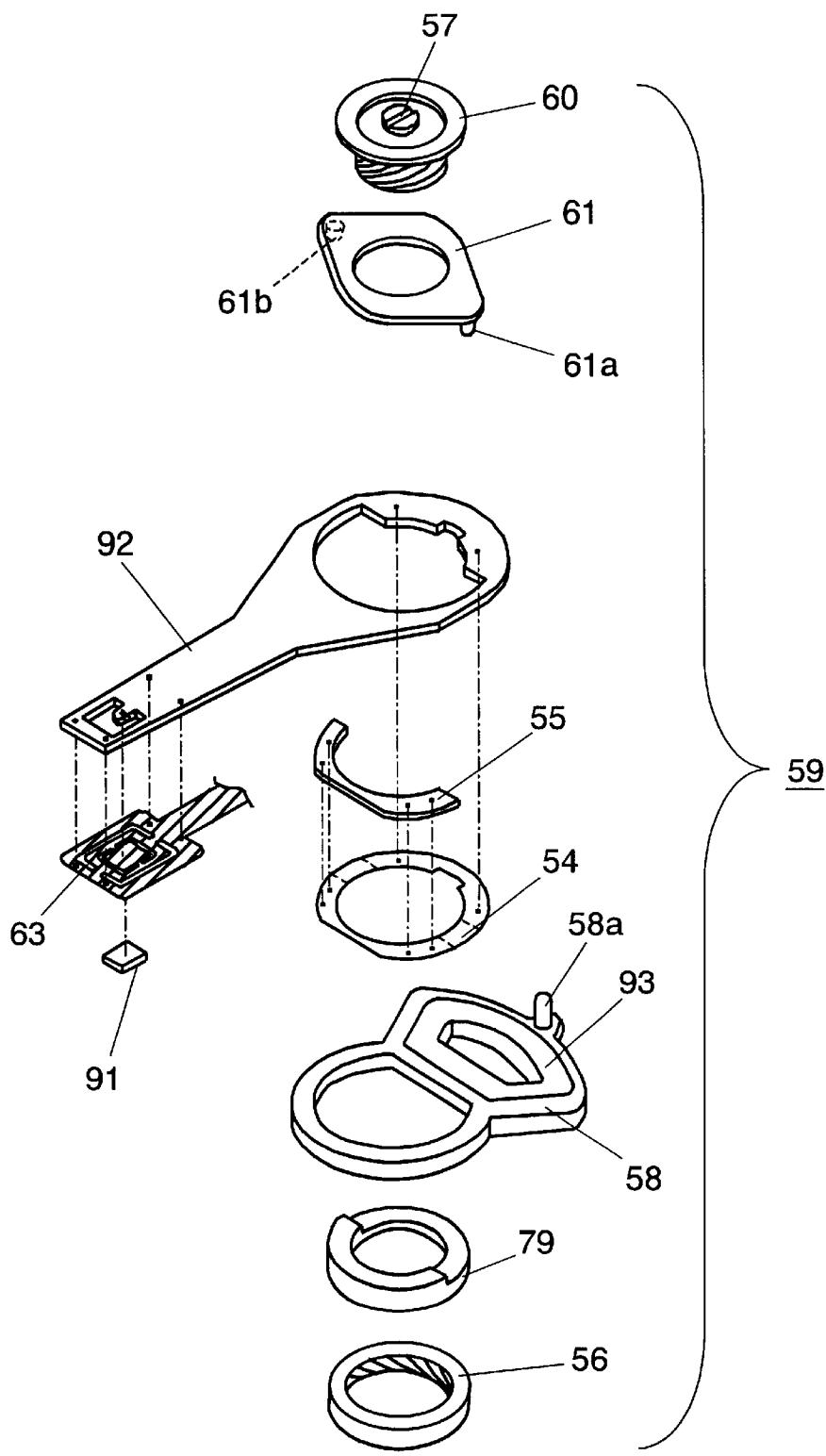
FIG. 9 is another exploded perspective view depicting the structure of the head supporting device according to the fourth exemplary embodiment of this invention.
Figure 10:
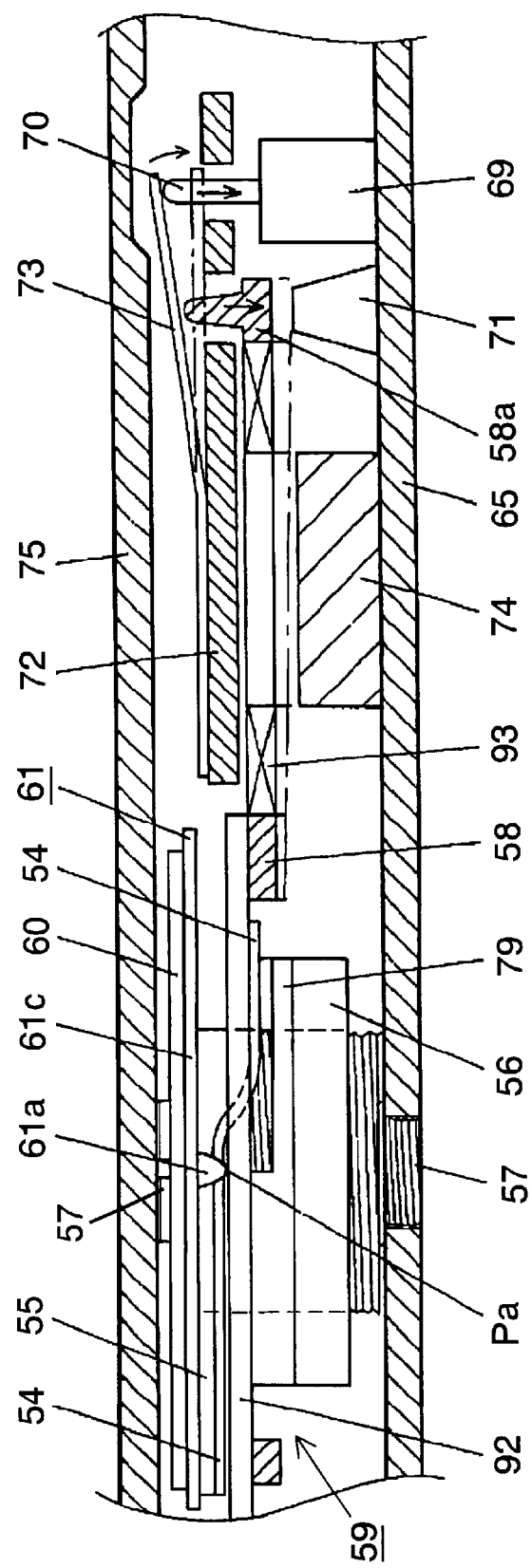
FIG. 10 is a side view of a main portion in the vicinity of a bearing unit, depicting the structure of the head supporting device according to the fourth exemplary embodiment of this invention.

Shown respectively in FIG. 8, FIG. 9 and FIG. 10 are an exploded perspective view illustrating a structure of the head supporting device to be mounted to the magnetic disk drive of this invention, another exploded perspective view of the same, and a side view of a main part in the vicinity of a bearing unit.

As shown in FIG. 8, FIG. 9 and FIG. 10, head supporting device 59 comprises plate spring 54 of generally an annular shape, spring fixation member 55 of semi-annular shape and support arm 92, wherein the plate spring 54 and the spring fixation member 55 are connected, and the plate spring 54 is also connected to the support arm 92. The support arm 92 is connected to coil holder 58 having coil 93 mounted thereto in a manner that it is rotatable in a radial direction of magnetic recording medium by function of a voice coil motor. In this structure, these component members, together with pivot pedestal 61 and collar 79, are held between baring unit 60 and nut 56.

Further, the complete head supporting device 59 is axially secured to substrate 65 with mounting screw 57 disposed to the baring unit 60 in a rotatable manner via a bearing, as shown in FIG. 10.

Referring now to FIG. 10, connections among the individual component members will be described in more detail. First, an upper surface of the plate spring 54 is connected with an underside surface of the support arm 92 at a portion on the right side of the drawing with respect to a rotational axis of the head supporting device 59. Also, the plate spring 54 and the spring fixation member 55, together with collar fringe 61c of the pivot pedestal 61 and the collar 79 having a cut-back portion, are sandwiched between the bearing unit 60 and the nut 56 at a portion on the left side of the drawing. In this structure, the support arm 92 is attached to the coil holder 58.

By constructing them as described above, there is realized the structure in which the plate spring 54 deforms in a manner that it bends into a shape of two-step stair, as shown in FIG. 10, and the support arm 92 is thus held flexibly.

In addition, the bearing unit 60 has a bearing built therein (not shown in the figure), and the support arm 92 can rotate in the radial direction of the magnetic recording medium, to move a magnetic head mounted to an underside surface at one end of it to an assigned position.

Bosses 61a and 61b are provided on the pivot pedestal 61 in a manner that they abut upon the support arm 92 on a phantom line that is perpendicular to both an axial direction of the bearing unit 60 and a longitudinal direction of the support arm 92, and traverses a rotational center of the bearing unit 60 in the radial direction of the recording medium.

Further, the bosses 61a and 61b on the pivot pedestal 61 are respectively arranged in positions that are symmetrical to each other with respect to a centerline along the longitudinal direction of the support arm 92. The support arm 92 is thus pushed downward by this pair of the bosses 61a and 61b.

Also, the head supporting device 59 is so constructed that a center of gravity of a portion retained by the plate spring 54, i.e. the center of gravity of the support arm 92 to which both the coil 93 and the coil holder 58 are mounted, is placed at a position substantially coincident with an intermediate point P on a line connecting in phantom between points Pa and Pb where the support arm 92 and the bosses 61a and 61b of the pivot pedestal 61 abut upon each other (a distance from the point P to the point Pa and another distance from the point P to the point Pb are equal as are shown by a symbol L in FIG. 8).

The above structure makes possible to provide the head supporting device 59 with limited vibrations to external shocks and stability. Although this is the case that can provide the head supporting device with the greatest possible resistance to shock, a deviation to certain extent does not present any problem for the practical purposes.

In addition, the head supporting device 59 may be so constructed that the center of gravity of the support arm 92 is located at a position substantially coincident with the point P, with the support arm 92 bearing the coil 93, the coil holder 58, the slider 91 and gimbals mechanism 63, all mounted thereto, taking into account weights of the slider 91 and the gimbals mechanism 63.

Referring now to FIG. 8, yoke 72 having slit opening 72a is placed above the coil holder 58. Boss 58a provided on the coil holder 58 is positioned in a movable manner along the slit opening 72a.

In addition, resilient member 73 made of spring plate is disposed to the yoke 72 in a manner to cover the slit opening 72a. The resilient member 73 is fixed to the yoke 72 at only one side closer to the support arm 92, so that the other side of it is vertically movable in a direction perpendicular to the magnetic recording medium due to vertical movement of solenoid pin 70 actuated by separately provided solenoid 69.

A detail as to how a turning mechanism operates to move the support arm 92 in the direction perpendicular to the magnetic recording medium will be described with reference to FIG. 10.

When the magnetic recording medium is caused to stop spinning, an electric current to the solenoid 69 is turned off, so that the solenoid pin 70 is let freely movable along its vertical axis. The resilient member 73 therefore stays in a position shown by a dashed line in FIG. 10, and it depresses the boss 58a provided on the coil holder 58 until it stops upon abutment with stopper 71. Since this holds down the coil holder 58 into a state shown by a dashed line in FIG. 10, the other end of the support arm 92 bearing the slider 91 rises upward with the bosses 61a and 61b of the pivot pedestal 61 acting as a fulcrum. As a result, the magnetic head mounted to the slider 91 is steadily kept standing off from the magnetic recording medium.

Accordingly, the head supporting device can be held steadily while maintaining a clearance between the magnetic head and the magnetic recording medium even when the magnetic recording medium is not spinning.

This also makes possible to provide the magnetic disk drive with superior resistance to shock as it does not require addition of any factors such as a head retainer and the like that increase the thickness.

Individual component members will be described hereinafter. First, the support arm 92 is formed unitary into a thickness of 64 μm with a metal such as stainless steel (SUS304). The support arm 92 may be formed using such methods as etching process or press forming.

By using the foregoing structure, a resonance frequency of the support arm 92 can be raised very high to approximately 10 kHz from approximately 2 kHz of the prior art devices. A magnetic disk drive featuring a head supporting device of faster rotation speed and faster access than the previous devices can be thus obtained.

In addition, a head portion of the support arm 92 may be provided with an angled fringe bent into a direction perpendicular to a writing surface of the magnetic recording medium, in an area shown with a symbol D in FIG. 8, in order to increase rigidity along its longitudinal direction.

As shown in FIG. 9, the slider 91 is supported tiltably by the gimbals mechanism 63 via a dimpled boss (not show in the figure) in the rolling direction as well as the pitching direction. A magnetic head is disposed to a surface of the slider 91 confronting the magnetic recording medium.

The gimbals mechanism 63 is welded at its periphery to the support arm 92. This materializes the structure in which the slider 91 is unlikely to cause magnetic and/or mechanical damages to the magnetic recording medium even when it receives any impact and the like from the outside.

The spring fixation member 55 is formed into a thickness of 0.1 mm with a metal such as stainless steel (SUS304). The plate spring 54 is formed into a thickness of 38 μm with a metal such as stainless steel (SUS304). The resilient member 73 is also formed into a thickness of 0.1 mm with stainless steel (SUS304). The yoke 72 is formed into a thickness of 0.2 mm with a soft magnetic material such as Permalloy and the like. They can be formed with such methods as etching process or press forming.

The coil holder 58 is formed into 0.3 mm in thickness using a metal such as aluminum, or PPS (polyphenylene sulfide). It can be formed using die-casting or press forming method in the case of aluminum, and the ordinary known plastic molding methods in the case of PPS.

Connections among the individual component members can be made by the known method such as spot welding, ultrasonic welding, laser welding, and the like method.

In this invention, the methods of manufacturing the individual component members and the methods of connecting those component members as described herein are illustrative and therefore not considered as restrictive.

By using the structure as described above, there can be made available the head supporting device capable of achieving the principle of operation discussed in the third exemplary embodiment.

Also, by adopting the head supporting device 59 of the foregoing structure, the support arm 92 can be made freely turnable about the bosses 61a and 61b of the pivot pedestal 61, which act as a fulcrum, in the direction perpendicular to the writing surface of the magnetic recording medium. Accordingly, there is made available a thin disk drive with an outstanding resistance to shock, since the head supporting device 59 is capable of holding the magnetic head away from the magnetic recording medium when the magnetic recording medium is not spinning.

Fifth Exemplary Embodiment

Described next as a fifth exemplary embodiment is a structure of a magnetic disk drive of this invention.

Figure 11:
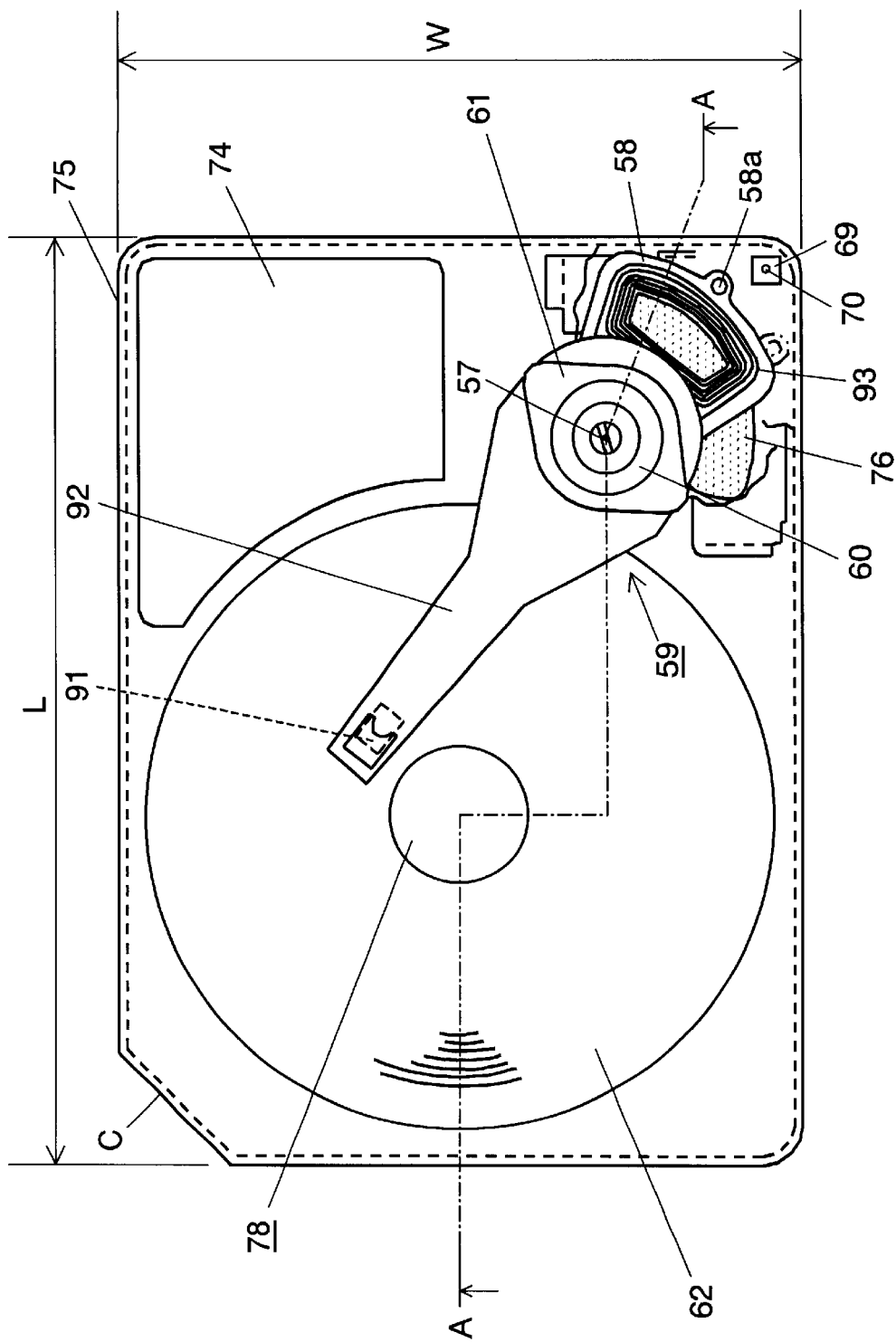
FIG. 11 is a plan view depicting a structure of a magnetic disk drive according to a fifth exemplary embodiment of this invention.
Figure 12:
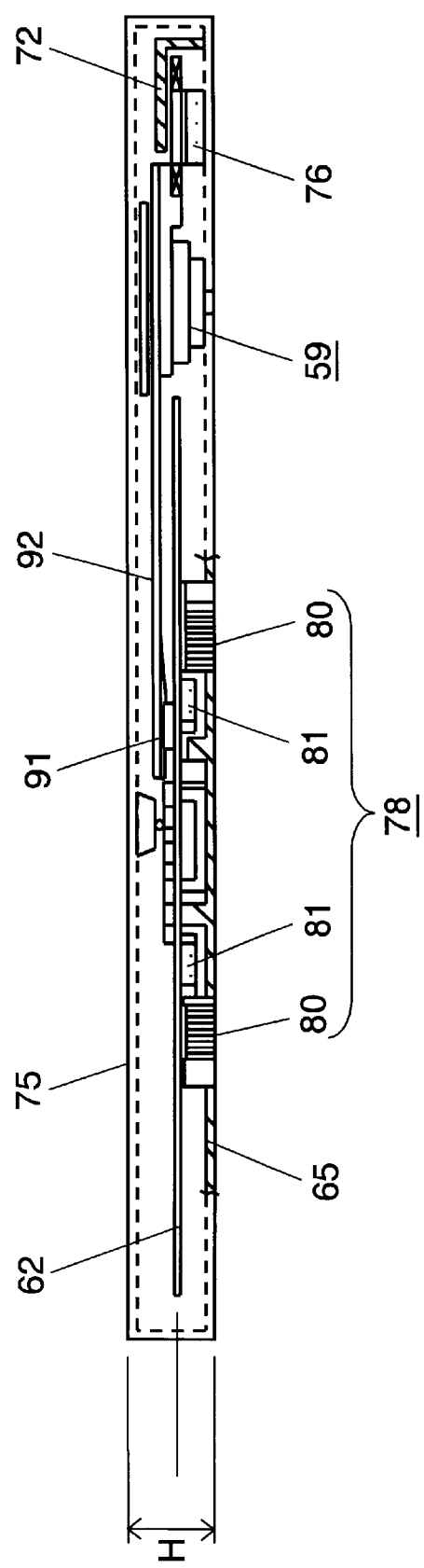
FIG. 12 is a sectional view depicting the structure of the magnetic disk drive according to the fifth exemplary embodiment of this invention.
Figure 13:
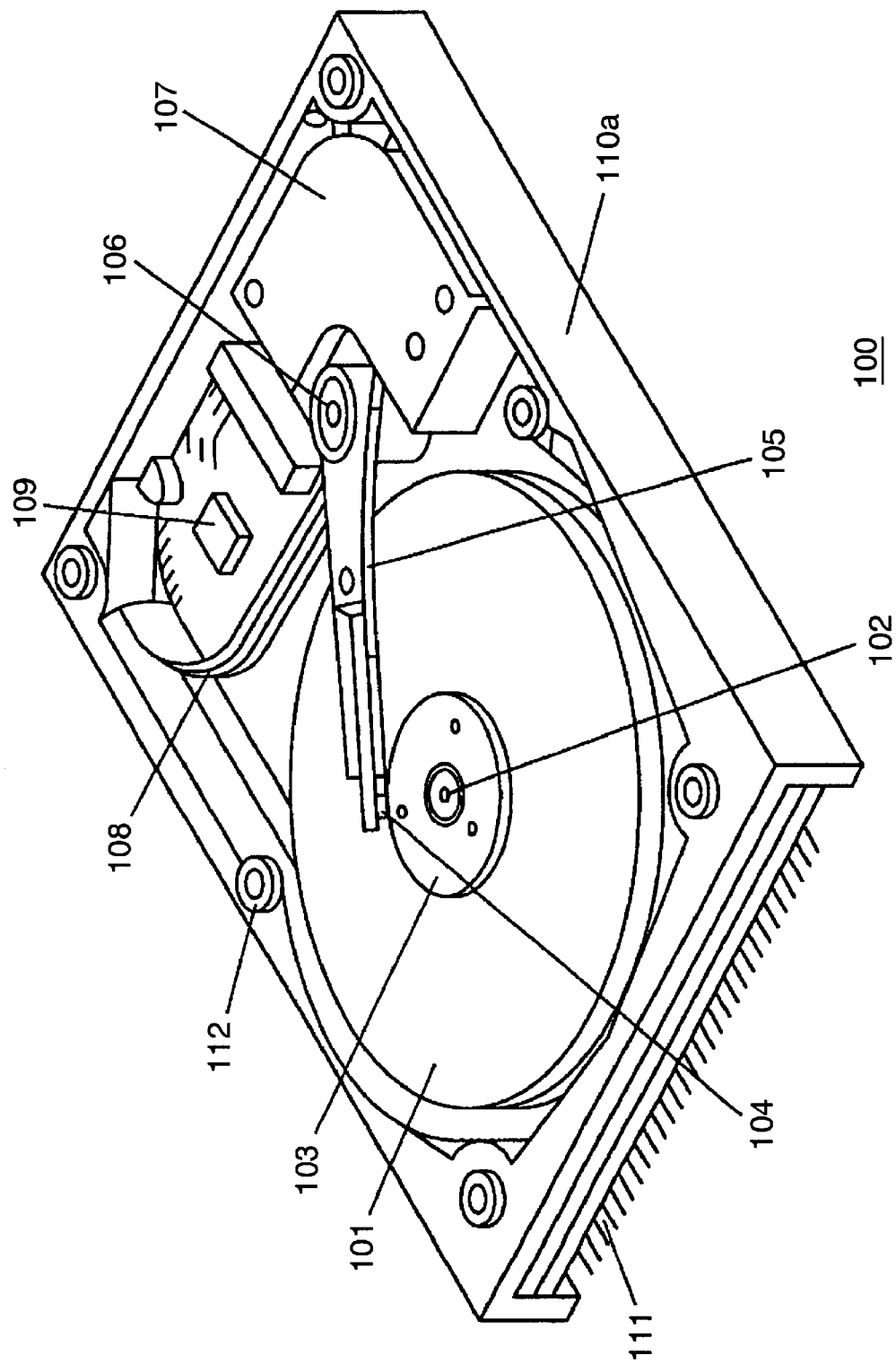
FIG. 13 is a perspective view depicting a structure of a magnetic disk drive of the prior art.
Figure 14:
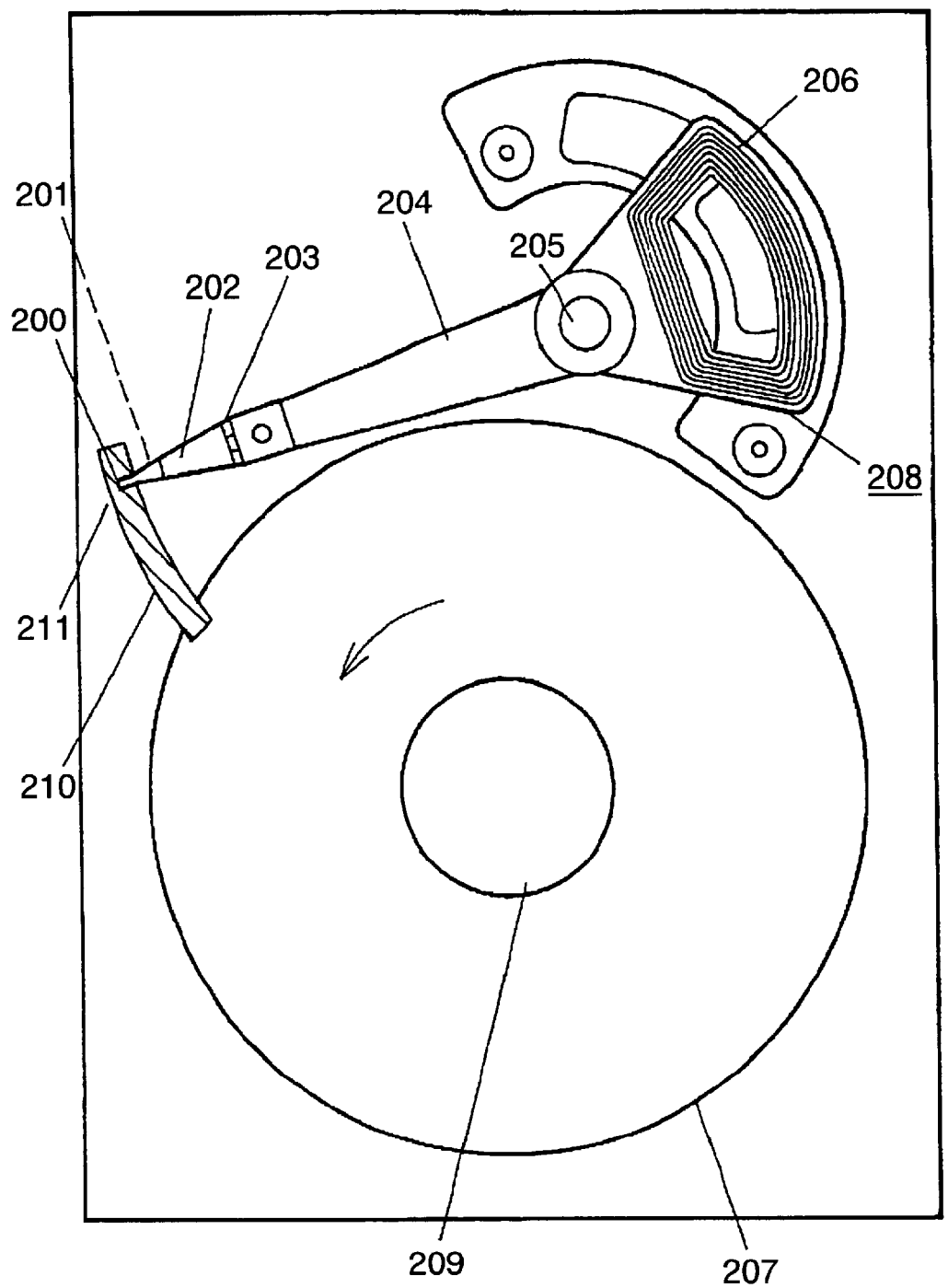
FIG. 14 is a plan view of the structure of the magnetic disk drive of the prior art.

FIG. 11 is a plan view depicting a structure of the magnetic disk drive according to this exemplary embodiment, and FIG. 12 is a sectional view taken along a line A—A of FIG. 11.

The magnetic disk drive of this invention is equipped with the head supporting device 59 described in the fourth exemplary embodiment. Support arm 92 formed of a solid material has slider 91 mounted to a surface at one end facing magnetic recording medium 62, and that the slider 91 is provided with a magnetic head (not show in the figure) mounted to its surface facing the magnetic recording medium 62. Coil holder 58 formed on the other end of the support arm 92 is provided with coil 93. The support arm 92 is constructed in a freely rotatable manner about an axis of baring unit 60 in a radial direction of the magnetic recording medium 62 by an interaction with magnet 76 mounted to substrate 65 and yoke 72.

In addition, there is solenoid 69 disposed to a corner of the magnetic disk drive where the baring unit 60 is located. When the magnetic recording medium 62 stops spinning, the support arm 92 is held in a position to maintain a clearance between the magnetic head and the magnetic recording medium 62 according to the mechanism described in the fourth exemplary embodiment.

The magnetic recording medium 62 is axially supported by spindle motor 78, which is defined as rotation means comprising the magnet 81 and the coil 80. During writing and/or reading operation in the magnetic disk drive, the magnetic head mounted to the slider 91 receives a certain amount of levitation off the magnetic recording medium 62 by a force derived relative to a levitational force due to airflow generated by spinning of the magnetic recording medium 62 driven by the spindle motor 78 and a thrusting force of the plate spring 54 which shifts the slider 91 toward the magnetic recording medium 62.

When the magnetic recording medium 62 is spun, a predetermined amount of current is supplied to the solenoid 69. This produces a certain amount of loading weight impressed on slider 91 toward the magnetic recording medium 62 as described in the fourth exemplary embodiment.

Control means 74 performs every control to start and stop spinning of the magnetic recording medium 62, and to rotate the support arm 92.

In addition, housing 75 of the disk drive is constructed to have the same dimensions as external dimensions of the SD memory card, which are 32 mm long (L) by 24 mm wide (W) by 2.1 mm high (H) as are illustrated in FIG. 11 and FIG. 12. It has such a shape that one corner is chamfered by 4 mm as marked with a symbol C in FIG. 11.

Every structural component is arranged in the magnetic disk drive of this exemplary embodiment in a manner which satisfies the correlation defining the exterior dimensions of the housing discussed in the first and the second exemplary embodiments of this invention.

In the magnetic disk drive of this exemplary embodiment, the housing 75 is formed of a 0.25 mm thick stainless steel, and the substrate 65 is constructed of aluminum by die-casting.

The chamfer C may be formed at a corner (i.e. an upper left corner in FIG. 11) opposite the area where the bearing unit 60 of the support arm 92 is disposed.

A reduction in thickness of the magnetic disk drive can be achieved by using the head supporting device of this invention since it does not require a head retainer hitherto needed in the conventional device of L/UL mode.

Further, the magnetic disk drive is equipped with the head supporting device described to the third and the fourth exemplary embodiments of this invention. This realizes the magnetic disk drive of outstanding resistance to shock while also achieving a reduction in the thickness, since it makes possible to keep a clearance between the magnetic head and the magnetic recording medium.

Thus, the invention materializes the magnetic disk drive having an exterior shape of the housing which is compatible with the SD memory card.

In addition, a terminal equipped in the magnetic disk drive of this invention for connection to an external device is designed to be compatible with the SD memory card. This allows a user to make good use of the magnetic disk drive of this invention, as if it is another SD memory card of larger capacity as compared to the conventional ones, without giving attention to the difference of recording medium inside.

In all of the exemplary embodiments of this invention, from the first to the fifth embodiments, what have been described are the magnetic disk drives, which use magnetic heads, and the head supporting devices incorporated therein. However, this invention is not restrictive only to the disk drives that use magnetic heads. This invention also exhibits similar advantages when adapted to other read/write disk devices of non-contact type such as optical disk drives, magneto-optic disk drives, and the like, as needless to mention.

What is claimed is:

1. A disk drive comprising:
   a spinnably supported recording medium;
   spinning means for spinning said recording medium;
   a head supporting device provided with a support arm and a head mounted to an underside surface at one end of said support arm, said support arm disposed in a rotatable manner about a bearing unit in any of a radial direction of said recording medium and a perpendicular direction to a writing surface of said recording medium, said head supporting device further having first resilient means for impressing a thrusting force on said support arm in a direction toward said recording medium and second resilient means for turning said support arm in a direction away from the writing surface of said recording medium;
   first rotating means for rotating said support arm in the radial direction of said recording medium;
   second rotating means for thrusting said support arm in a manner to turn said support arm in the perpendicular direction with respect to the writing surface of said recording medium; and
   control means electrically in connection with said head, said spinning means, said first rotating means and said second rotating means, for exchanging a signal with said head, for controlling spinning of said recording medium, and for controlling rotation of said support arm;
   wherein said bearing unit of said head supporting device is provided with a pivot pedestal having a pair of bosses disposed in a manner to contact with said support arm, and said support arm is disposed rotatably in the perpendicular direction to the writing surface about a fulcrum served by points where said bosses on said pivot pedestal abut upon said support arm.

2. The disk drive as set forth claim 1, wherein said second rotating means turns said support arm in the direction away from the writing surface of said recording medium to separate said head from said recording medium when said recording medium stops spinning.

3. The disk drive as set forth in claim 1, further comprising a housing containing therein said recording medium, said spinning means, said head supporting device and said control means, wherein said housing has an exterior thickness which ranges from 2.1 mm to 3.3 mm.

4. The disk drive as set forth in claim 1, wherein said first resilient means of said head supporting device comprises a plate spring disposed between said bearing unit and said support arm.

5. The disk drive as set forth in claim 1, wherein said second resilient means of said head supporting device comprises a plate spring depressing another end of said support arm downward in a direction to said recording medium.

6. The disk drive as set forth in claim 1, wherein said pair of bosses provided on said pivot pedestal of said head supporting device are arranged to abut on said support arm on a line perpendicular to both an axial direction of said bearing unit and a longitudinal direction of said support arm, said line traversing a rotational enter of said bearing unit in the radial direction of said recording medium.

7. The disk drive as set forth in claim 1, wherein said bosses on said pivot pedestal of said head supporting device are each arranged to positions symmetrical to each other with respect to a centerline in the longitudinal direction of said support arm.

8. The disk drive as set forth in claim 1, wherein said head of said head supporting device is retained by a slider disposed to said support arm.

9. The disk drive as set forth in claim 8 further comprising a gimbals mechanism disposed to said support arm of said head supporting device for supporting said slider freely movably in any of a rolling direction and a pitching direction.

10. The disk drive as set forth in claim 1, wherein said first rotating means of said head supporting device comprises a voice coil motor formed on said support arm.

11. The disk drive as set forth in claim 1, wherein said second rotating means of said head supporting device comprises a solenoid.

12. The disk drive as set forth in claim 1, wherein a center of gravity of a portion of said head supporting device held by said first resilient means is generally coincident with a point of intersection between a rotational axis of said support arm in the radial direction of said recording medium and another rotational axis in the perpendicular direction to the writing surface of said recording medium.

13. The disk drive as set forth in claim 1, wherein said recording medium is discoidal in shape, not provided with a through hole in the center, and has a recording layer formed on only one of surfaces thereof.

14. The disk drive as set forth in claim 1, wherein said recording medium is discoidal in shape, not provided with a through hole in the center, has a recording layer formed on only one of surfaces thereof, and a shaft provided in the center of the other surface, said shaft pivotally fitted in a hub of said spinning means.

15. The disk drive as set forth in claim 14, wherein a permanent magnet is disposed around said shaft on the same surface as said shaft in a manner to face a stator of said spinning means.

16. The disk drive as set forth in claim 1, wherein an external shape of said housing measures approximately 2.1 mm in thickness.

17. The disk drive as set forth in claim 16 having a storage capacity of at least 1 Gigabyte.

18. The disk drive as set forth in claim 1, wherein an external shape of said housing is compatible in dimensions with SD memory card.

19. The disk drive as set forth in claim 1, wherein an external shape of said housing measures approximately 24 mm in width and approximately 32 mm in length.

20. The disk drive as set forth in claim 19 having a storage capacity of at least 1 Gigabyte.

21. A disk drive for use with a recording medium, comprising:
   a head supporting device provided with a support arm and a head mounted to said support arm, said support arm rotatable:
      about a bearing unit having an axis perpendicular to a plane along a recording surface of said disk; and
      towards and away from said recording surface so that said head moves along a path which intersects said recording surface;
   a first source of force for impressing thrusting force on said support arm toward said recording medium;
   a second source of force for turning said support arm away from the recording medium;
   a first rotation unit for rotating said support arm about said axis perpendicular to said plane; and
   a second rotation unit for moving said support arm along said path,
   wherein said bearing unit of said head supporting device is provided with a pivot pedestal having a pair of bosses disposed in a manner to contact with said support arm, and said support arm is disposed rotatably in the perpendicular direction to the recording surface about a fulcrum served by points where said bosses on said pivot pedestal abut upon said support arm.

* * * * *

UNITED STATES PATENT AND TRADEMARK OFFICE
CERTIFICATE OF CORRECTION

PATENT NO. : 6,826,018 B2
DATED : November 30, 2004
INVENTOR(S) : Hideki Kuwajima et al.

It is certified that error appears in the above-identified patent and that said Letters Patent is hereby corrected as shown below:

<u>Title page,</u>
Item [56], References Cited, U.S. PATENT DOCUMENTS, insert
-- 5,572,388 11/1996 Yagi et al. --.

Signed and Sealed this

Twenty-first Day of June, 2005

JON W. DUDAS
*Director of the United States Patent and Trademark Office*